(12) United States Patent
Konno et al.

(10) Patent No.: US 7,446,847 B2
(45) Date of Patent: Nov. 4, 2008

(54) OPTICAL ISOLATOR AND OPTICAL DEVICE

(75) Inventors: Yoshihiro Konno, Tokyo (JP); Masaru Sasaki, Tokyo (JP)

(73) Assignee: Namiki Seimitsu Houseki Kabushiki, Tokyo (JP)

( * ) Notice: Subject to any disclaimer, the term of this patent is extended or adjusted under 35 U.S.C. 154(b) by 222 days.

(21) Appl. No.: 10/589,581

(22) PCT Filed: Feb. 23, 2005

(86) PCT No.: PCT/JP2005/002857

§ 371 (c)(1),
(2), (4) Date: Aug. 16, 2006

(87) PCT Pub. No.: WO2005/083495

PCT Pub. Date: Sep. 9, 2005

(65) Prior Publication Data

US 2007/0177264 A1     Aug. 2, 2007

(30) Foreign Application Priority Data

Feb. 26, 2004     (JP) ............................ 2004-051944

(51) Int. Cl.
*G02F 1/13* (2006.01)
*G02B 27/28* (2006.01)

(52) U.S. Cl. .................. 349/193; 349/194; 359/495

(58) Field of Classification Search ................ 349/193, 349/194; 359/494–501
See application file for complete search history.

(56) References Cited

U.S. PATENT DOCUMENTS

| 5,689,360 | A | * | 11/1997 | Kurata et al. | ............... 359/281 |
| 6,480,331 | B1 | * | 11/2002 | Cao | ........................... 359/484 |
| 7,072,111 | B2 | * | 7/2006 | Iwatsuka | .................... 359/484 |

FOREIGN PATENT DOCUMENTS

| JP | 06-067118 | 3/1994 |
| JP | 08-136859 | 5/1996 |

* cited by examiner

*Primary Examiner*—Kevin S Wood
(74) *Attorney, Agent, or Firm*—Studebaker & Brackett PC; Donald R. Studebaker

(57) ABSTRACT

A simple-structure, small-size, inexpensive optical isolator mounted in an amplifier. The PMD and PDL are reduced to desired numerical levels to improve the characteristics. The optical isolator is composed of two double refraction elements, a 45 DEG Faraday rotator, a magnet, a lens, and a total reflection member. The directions of crystal axes of the two double refraction elements and the direction of the rotation of the Faraday rotator are appropriately set. Therefore, going-returning optical paths where incident unpolarized light is separated into ordinary light and extraordinary light, totally reflected by a total reflection member, and outputted are formed. The direction of the crystal axis with respect to the direction of the normal on the element surface of either of the two double refraction elements and the thickness in the direction of the normal on the element surface are corrected.

13 Claims, 8 Drawing Sheets

PRIOR ART

OPTICAL ISOLATOR AND OPTICAL DEVICE

TECHNICAL FIELD

The present invention relates to a polarization-independent optical isolator, which is inserted (in an in-line arrangement) between optical fibers for optical communication equipment and optical information processors, and operates regardless of the plane of light polarization. The present invention also relates to an optical device provided with such an optical isolator.

BACKGROUND ART

When the amount of light is attenuated, for example, and propagates through an optical fiber for a long distance or when light branches from an optical fiber, the light is optically amplified by an erbium-doped optical fiber amplifier (hereinafter referred to as "amplifier") or the like. This amplification amplifies light directly without converting the light to an electrical signal. The aforementioned amplifier is constituted by a lot of optical devices such as a lens, mirror, and filter and the like. For this reason, when the amplifier receives optical feedback reflected from the optical elements or from the light inlet/outlet end of the optical fiber inside the amplifier, the light resonates, which results in degradation of the amplification. Accordingly, an optical isolator is used for preventing the optical feedback.

Further, the light propagating through an optical fiber is influenced by external stress on the optical fiber or by the bending of the optical fiber so that polarization is not constant. Thus, the preferable optical isolators inserted between the optical fibers are polarization-independent optical isolators, which are independent of the state of polarization propagating from within the optical fiber.

As described above, polarization-independent optical isolators were designed. The isolators comprise the optical elements that are a first, second, and third birefringent element and a first and second 45-degree Faraday rotator, wherein the first 45-degree Faraday rotator is inserted between the first and second birefringent elements and the second 45-degree Faraday rotator is inserted between the second and third birefringent elements so that the optical elements are arranged in series along an optical path.

In such an arrangement, however, since the respective optical elements are arranged in series, the dimension of the optical isolator in the direction along the optical path is large and cannot be reduced in size. Further, the optical fibers must be positioned at opposite ends of the optical isolator for optically coupling this optical isolator and optical fibers. Therefore, when the aforementioned optical isolator is incorporated in an amplifier, a large area is required for routing the optical fibers within the amplifier because the optical fiber cannot be bent in a smaller radius due to the bending loss of the optical fiber, wherein the problem arises that reducing the size of the amplifier is difficult. In addition, for optically coupling the aforementioned optical isolator and the optical fibers, the optical isolator requires lenses on both the incident light side and the light-exiting side. Thus, at least two lenses are necessary for each optical isolator, which results in the problem that the number of constituent components increases.

In consideration of the problems of the in-line optical isolators as described above, in-line optical isolators have been devised wherein the constituent components have been reduced in number and size (see Patent Reference 1).

Patent Reference 1: JP06-067118A (Pages 3-4 & FIG. 1)

FIG. 13 and FIG. 14 are side views for illustrating the operation of an optical isolator 100. Specifically, FIG. 13 is a side view showing the change in the polarization and optical paths when light is transmitted in the forward direction, and FIG. 14 is a view showing the change in polarization and optical paths when light is transmitted in the reverse direction.

In the optical isolator 100 in FIG. 13 and FIG. 14, reference numerals 101 and 102 designate an optical fiber; 103 designates an optical fiber array; 104 designates a birefringent element; 105 a half-wave plate; 106 a GRIN lens; 107 a Faraday rotator; 108 a reflection member; 109 a glass plate; 110 a magnet; and 111-118 and 121-128 propagating light.

The optical fibers 101 and 102 are arranged in parallel on a glass plate and constitute the optical fiber array 3. The birefringent element 104, which is a rutile type crystal, has a half-wave plate 105 attached to half the area on one side thereof and further has the glass plate 109 having the same thickness as the half-wave plate 105 on the remaining half area on this side. The half-wave plate 105 and the glass plate 109 are positioned so that the boundary between the half-wave plate 105 and the glass plate 109 is located between the optical fibers 101 and 102, and as a result, of which only the light entering/exiting the optical fiber 102 can transmit the half-wave plate 105. The Faraday rotator 107 is attached to the end face of the Grin lens 106, and further the reflection member 108 is attached to the Faraday rotator 107. The magnet 110 is provided around the outer periphery of the Faraday rotator 107.

The operation of the optical isolator 100 will now be described. Non-polarized light incident from the optical fiber 101 is split into an ordinary ray 111 and extraordinary ray 112 by the birefringent element 104, and the optical path of the extraordinary ray 112 varies. The ordinary ray 111 and the extraordinary ray 112 are converted to parallel light rays at the end face of the GRIN lens 106 on the birefringent element 104 side. The light 113 and the light 114 out of the GRIN lens 106 are rotated 22.5 degrees in a counterclockwise direction when transmitted through the Faraday rotator 107 and further rotated 22.5 degrees in a counterclockwise direction when transmitted through the reflection member 108. As a result, the light 113 and the light 114 are rotated through 45 degrees in total. The light 113 and the light 114 are reflected by the reflection member 108, and the light 113 propagates an optical path represented by the light 115, while the light 114 propagates an optical path represented by light 116. The light 115 and light 116 from the Faraday rotator 107 enter the half-wave plate 105 while being condensed by the GRIN lens 106. The half-wave plate 105 receives linearly polarized light incident thereon at angle θ with respect to the optical axis thereof and operates to output the light as linearly polarized light at angle −θ with respect to the optical axis of the half-wave plate 105. The half-wave plate 105 is provided such that the direction of the optical axis thereof makes an angle of 22.5 degrees with respect to the extraordinary ray 112. Therefore, when the light 115 and light 116 pass through the half-wave plate 105, the polarization states change such that the polarization planes are further rotated 45 degrees in a counterclockwise direction. Since the light transmitted through the half-wave plate 105 enters the birefringent element 104, when the light 117 that is an extraordinary ray and the light 118 that is an ordinary ray are transmitted from the birefringent element 104, their optical paths are matched. Further, since the light 117 and the light 118 are condensed by the GRIN lens 106, they are effectively coupled to optical fiber 102 with a loss as low as 0.5 dB.

On the other hand, in FIG. 14, when unpolarized light is transmitted from the optical fiber 102, the birefringent element 104 separates the light into an ordinary ray 121 and an extraordinary ray 122, which propagate, respectively, along different optical paths. When transmitted through the half-wave plate 105, their polarization planes are rotated in a clockwise direction, and then converted to parallel rays by the GRIN lens 106. Before and after reflected by the reflection member 108, the light 123 and light 124, propagating within the GRIN lens 106, are transmitted through the Faraday rotator 107 twice. At this time, the polarization planes are rotated 45 degrees in total in a counterclockwise direction. The light 123 and the light 125 are reflected by the reflection member 108, and the light 123 propagates an optical path represented by the light 125, while the light 124 propagates an optical path represented by light 126. Further, the light 125 and light 126 propagate while being condensed by GRIN lens 106. When light 127 from glass plate 109 is transmitted through birefringent element 104, light 127 travels straight away because it propagates as an ordinary ray and does not enter the optical fiber 101. Since the light 128 propagates from the birefringent element 104 as an extraordinary ray, its optical path is deflected and does not enter the optical fiber 101.

In this way, an optical isolator function can be obtained in which the light transmitted from the optical fiber 101 is coupled to the optical fiber 102 while the light from the optical fiber 102 is not coupled to the optical fiber 101.

As described above, the going optical paths and returning optical paths (going-returning optical paths) are formed by providing the reflection member, the number of lenses used is only one, whereby an optical isolator constituted by the smaller number of components can be provided. In addition, compared with the aforementioned optical isolator in the in-line arrangement, the dimension in the optical path direction becomes shorter, which meets the requirement for a reduction in size. Further, the optical fibers 101 and 102 are disposed on only one side of the optical isolator 100, which provides the effect of reducing the area for routing optical fibers within the amplifier when incorporating the optical isolator in the amplifier, which contributes to a reduction in the size of the amplifier.

In the structure shown in FIG. 13 and FIG. 14, however, since only the light 114 is shifted by the birefringent element 104 and then the light 113 and light 114 are launched into the GRIN lens 106, an optical path length difference by the shifted amount is produced between the light 113 and the light 114. Thus, the optical path length difference between the light 113 and the light 114 before being transmitted into the GRIN lens 106 is not reduced to the desired numerical level. Therefore, their focal position on the reflection member 108 are not matched, and the optical paths along which the light 113 and the light 114 propagate after reflection are different. To this end, when the optical paths of the ordinary ray 118 and extraordinary ray 117 are matched by the birefringent plate 104, a polarization dependent loss (PDL) occurs, which decreases the optical coupling efficiency to the optical fiber 102 on the light-exiting side.

In consideration of such PDL, composite module of optical elements having an isolator function provided by disposing a plurality of birefringent elements upstream from the lens have been devised (see, for example, Patent Reference 2).

Patent Reference 2: JP08-136859A (Page 11 & FIG. 8)

FIG. 15 is a side view for illustrating operations of such composite module of optical elements. In composite module 130 of optical elements, near a first end 136a of a GRIN lens 136, a wavelength selection filter 137, a Faraday rotator 138 and a reflection member 140 are arranged in this order from a position closer to the end 136a, and a magnet 139 is provided around the outer periphery of the Faraday rotator 138. On the other hand, near a second end 136b of the GRIN lens 136, a half-wave plate 135, a birefringent element 134, and a plurality of single mode optical fibers 131, 132, and 133 are arranged in this order from a position closer to the end 136b. The birefringent element 134 comprises first and second birefringent parts 134a and 134b. The first and second birefringent parts 134a and 134b are arranged such that their crystal axes are directed in a predetermined direction with respect to the optical axis of the GRIN lens 136 (e.g., a direction substantially orthogonal to the optical axis or a direction slanted to a predetermined angle with respect to the optical axis) with their crystal axes being directed opposite directions to each other so as to make an angle of 180 degrees. Further, the half-wave plate 135 is positioned only upstream the optical fiber 133 such that the light rays out of the optical fibers 131 and 132 are not transmitted through the half-wave plate 135.

The light of wavelength $\lambda 1$ having random polarized components outgoing from the optical fiber 131 is split into two orthogonally polarized light rays by the first birefringent portion 134a. The respective light rays so split are converted to parallel light rays by the GRIN lens 136 and enter the wavelength selection filter 137. The light incident upon the wavelength selection filter 137 is reflected thereby and propagates through the GRIN lens 136 in the opposite direction, emerges from the symmetrical position with respect to the optical axis of the GRIN lens 136, and enters the second birefringent portion 134b. The second birefringent portion 134b reverses the propagation direction in the first birefringent portion 134a of the extraordinary ray so that the optical paths of the ordinary ray and extraordinary ray are matched. The optical paths so matched are launched into the optical fiber 132.

The light of wavelength $\lambda 2$ from the optical fiber 132 is split into two orthogonally polarized light rays by the second birefringent portion 134b. The respective light rays so split are converted to parallel light rays by the GRIN lens 136, transmitted through the wavelength selection filter 137 and the Faraday rotator 138, and enter the reflection member 140. When transmitted through the Faraday rotator 138, the polarization planes of the incident light rays are rotated 22.5 degrees. When the light rays reflected by the reflection member 140 are re-transmitted through the Faraday rotator 138, their polarization planes are further rotated 22.5 degrees. Besides, the polarization planes of the light rays, which are transmitted through the wavelength selection filter 137 and the GRIN lens 136 and enter the half-wave plate 135, are rotated 45 degrees, and then enter the second birefringent portion 134b. The polarization state of the light at this time is that rotated 90 degrees from the state when the second birefringent portion 134b first separates the light into the ordinary ray and the extraordinary ray. Therefore, as the rays re-enter the second birefringent portion 134b, the incident ordinary ray propagates through the second birefringent portion 134b as an extraordinary ray while the incident extraordinary ray propagates thorough the second birefringent portion 134b as an ordinary ray. Thus, the optical paths of the light rays are matched at the output end of the second birefringent portion 134b, and the light enters the optical fiber 133.

On the other hand, the light of wavelength $\lambda 2$ propagating in the opposite direction is split to an ordinary ray and an extraordinary ray by the second birefringent portion 134b, and the rays enter the half-wave plate 135. The half-wave plate 135 rotates 45 degrees the polarization planes of the incident light rays, and the light rays then enter the GRIN lens 136. The light rays are then converted to parallel light rays by the GRIN lens 136, the polarization plane of the light rays is rotated 22.5 degrees by the Faraday rotator 138, and the resulting light rays impinge upon the reflection member 140.

The light rays reflected by the reflection member 140 are re-transmitted through the Faraday rotator 138 wherein their polarization planes are further rotated 22.5 degrees. As a result, when the light rays re-enter the second birefringent portion 134b, the incident ordinary ray propagates through the second birefringent portion 134b as an extraordinary ray while the incident extraordinary ray propagates thorough the second birefringent portion 134b as an ordinary ray, so that the optical paths of these light rays are not matched and the light rays do not enter the optical fiber 132.

As described above, the composite module 130 of optical elements is realized wherein an optical multiplexing function and an optical isolator function are provided together, and wherein a third birefringent portion 134c and a fourth birefringent portion 134d are respectively bonded to the first birefringent portion 134a and the second birefringent portion 134b such that their crystal orientations are substantially orthogonal to each other, which makes the optical path length of the optical fiber 1 equal to that of the optical fiber 2. Patent Reference 2 concludes that the aforementioned structure can reduce the degradation caused by PDL resulting from the difference in the optical path length between the ordinary ray and the extraordinary ray.

In the case of the optical isolator 100 shown in FIGS. 13 and 14, however, since the rotation angle of the Faraday rotator 107 is set at 22.5 degrees (total 45 degrees by two transmissions), when the light is reflected and re-enters the birefringent element 104, if the half-wave plate 105 is not provided, the light re-enters the birefringent element 104 with the polarization state in which the light remains rotated 45 degrees by the Faraday rotator 107. Thus, the polarization plane of the light 115 does not meet the crystal axis of the birefringent element 104, so that when the light 115 and the light 116 are transmitted from the birefringent element 104, the optical paths thereof are not matched and only light 116 is optically coupled to the optical fiber 102. As a result, reduction in coupling efficiency between the propagating light and the optical fiber 102 is caused.

Further, when the light in the opposite direction is transmitted from the optical fiber 102 and the light re-enters the birefringent element 104, the polarization plane of the light 126 is not aligned with the crystal axis of the birefringent element 104, so that the light 126 is not shifted and transmitted as it is into the optical fiber 101 as an optical feedback. As a result, the optical isolator 100 suffers from reduction in extinction ratio. The foregoing discussion also applies to the optical path providing the optical isolator function in the composite module 130 of optical elements shown in FIG. 15.

As described above, for the optical isolator using the going-returning optical paths based on reflection, a desired optical isolation property cannot be obtained without aligning the polarization plane of the extraordinary ray with the crystal orientation when the light is caused to re-enter the birefringent element when the light is sent forth along the going optical paths. Thus, the half-wave plate is an essential optical element. However, apart from the Faraday rotator, it is necessary to provide an optical element (half-wave plate) for rotating the polarization plane. Thus, the number of the kinds of the optical elements to be used becomes greater than that of the aforementioned optical isolator of the in-line arrangement (for the optical isolator of the in-line arrangement, required optical elements are two kinds: a birefringent element and a Faraday rotator). Therefore, they are not necessarily efficient means for reducing the manufacturing process and the manufacturing cost.

Further, since there is a point that the optical path passes through the half-wave plate, a new separate component of a glass plate is required to match the optical path lengths of a going path through which light is sent forth and a returning path through which light is sent back. Thus, in terms of decreasing the absolute number of components, it is not a desirable structure.

Further, since the structure shown in FIG. 15 is devised to provide both the optical multiplexing function and the optical isolator function by a single optical device, its optical path design is made more complex. Furthermore, in this structure, the birefringent elements 4c, 4d are provided for eliminating the PDL. However, it is possible to provide the optical isolator function without the third and fourth birefringent portions 134c, 134d. In other words, the optical device shown in FIG. 15 is the device having the optical paths designed to provide the third and fourth birefringent portions 134c, 134d which are not indispensable in view of providing the optical isolator function. Thus, the suggestion was not sufficient for simplification of the structure and reduction in the size and cost of the optical isolator incorporated in the amplifier.

DISCLOSURE OF INVENTION

The present invention has been made in light of the foregoing problems. An object of the invention is to achieve simplification and reduction in size and cost of the structure of an optical isolator incorporated in an amplifier. Another object of the invention is to provide an optical isolator wherein its polarization mode dispersion (PMD) and PDL are reduced to desired numerical levels such that its inherent characteristics can be improved. Another object of the invention is to provide an optical device provided with the optical isolator.

The invention as defined in claim 1 of the application is an optical isolator comprising a first birefringent element, to which unpolarized light is transmitted and a second birefringent element to which light split into an ordinary ray and an extraordinary ray is transmitted; a Faraday rotator which is disposed between the first and second birefringent elements and has a rotation angle of 45 degrees when magnetically saturated; a magnet for magnetically saturating the Faraday rotator; a lens for converging the ordinary ray and the extraordinary ray outgoing from the second birefringent element; and a total reflection member for completely reflecting point-symmetrically the ordinary ray and the extraordinary ray by way of conversion of the lens, wherein the first birefringent element is constituted by a first birefringent plate and a second birefringent plate, crystal axis orientations of the first and second birefringent plates being different by 90 degrees from each other when viewed from the light incident side; supposing that a horizontal direction is 0 degrees, the crystal axis orientations of the first birefringent plate when viewed from the light incident side in a forward direction is set at 45 degrees or 135 degrees; a rotation direction of the Faraday rotator when viewed from an incident side of light, which is transmitted through the Faraday rotator and propagated to the second birefringent element is set to a clockwise direction when the crystal axis orientation of the first birefringent plate is 45 degrees; and a counterclockwise direction when the crystal axis orientation of the first birefringent plate is 135 degrees; a crystal axis direction of the second birefringent element when viewed from the light incident side is set different by 45 degrees to the first crystal axis orientation; the unpolarized light launched in the first birefringent plate is split to an ordinary ray and an extraordinary ray; the ordinary ray and the extraordinary ray are launched in the Faraday rotator wherein polarization planes thereof are rotated 45 degrees; when the split light is transmitted through the second birefringent element, the light transmitted through the first birefringent plate as the ordinary ray is transmitted therethrough as an extraordinary ray while the light transmitted through the first birefringent plate as the extraordinary ray is transmitted therethrough as an ordinary ray; and the resulting ordinary ray and extraordinary ray are transmitted in the lens and completely reflected point-symmetrically by the total reflection member at a single point; the ordinary ray and the extraordinary ray, which are completely reflected by the total reflection member are re-transmitted in the second birefringent element and the Faraday rotator in this order; when the ordinary ray and the extraordinary ray are finally transmitted through the second birefringent plate, the light transmitted through the second birefringent element as the ordinary ray after total reflection is transmitted therethrough as an extraordinary ray, while the light transmitted through the second birefringent element as the extraordinary ray after total reflection is transmitted therethrough as an ordinary ray; further, the optical isolator has going-returning paths wherein the optical paths of an ordinary ray and an extraordinary ray are matched when the ordinary ray and the extraordinary ray are transmitted through the second birefringent plate; the optical path length from a center of polarization plane of the ordinary ray transmitted in the lens from the second birefringent element to the single point on the total reflection member and the optical path length from a center of polarization plane of the extraordinary ray transmitted in the lens from the second birefringent element to the single point on the total reflection member is set equal; and the second birefringent element has a crystal axis orientation with respect to an element surface normal direction and an element surface normal direction thickness which are necessary for setting an isolated width difference and a polarization mode dispersion between the ordinary ray and extraordinary ray produced in the first birefringent element at less than 0.5 μm and 0.05 ps, respectively.

Further, the invention as defined in claim 2 of the application is the optical isolator wherein an angle of the crystal axis with respect to an element surface normal direction of the first birefringent element is set at 47.8 degrees and an angle of the crystal axis with respect to an element surface normal direction of the second birefringent element is set at 59 degrees.

The invention as defined in claim 1 of the application is an optical isolator comprising a first birefringent element to which unpolarized light is transmitted and a second birefringent element to which light split into an ordinary ray and an extraordinary ray is transmitted; a Faraday rotator which is disposed between the first and second birefringent elements and has a rotation angle of 45 degrees when magnetically saturated; a magnet for magnetically saturating the Faraday rotator; a lens for converging the ordinary ray and the extraordinary ray outgoing from the second birefringent element; and a total reflection member for completely reflecting point-symmetrically the ordinary ray and the extraordinary ray by way of conversion of the lens, wherein the first birefringent element is constituted by a first birefringent plate and a second birefringent plate, crystal axis orientations of the first and second birefringent plates being different from each other by 180 degrees when viewed from the light incident side; wherein, supposing that a horizontal direction is 0 degree, the crystal axis orientations of the first birefringent plate when viewed from the light incident side in a forward direction is set at 90 degrees; a rotation direction of the Faraday rotator when viewed from an incident side of light which is transmitted through the Faraday rotator and propagated to the second birefringent element is set to a clockwise direction; the second birefringent element is constituted by a third birefringent plate and a fourth birefringent plate, crystal axis orientations of the third and fourth birefringent plates are different by 90 degrees from each other when viewed from the incident light side; supposing that a horizontal direction is 0 degrees, the crystal axis orientations of the third birefringent plate when viewed from the light incident side in a forward direction is set at 135 degrees, and a crystal axis direction of the second birefringent element when viewed from the light incident side is set different by 45 degrees from the first crystal axis orientation; after the unpolarized light transmitted in the first birefringent plate is split to an ordinary ray and an extraordinary ray and the ordinary ray and the extraordinary ray are transmitted in the Faraday rotator wherein the polarization planes thereof are rotated 45 degrees, and when the split light is transmitted through the third birefringent element, the light transmitted through the first birefringent plate as the ordinary ray is transmitted therethrough as an extraordinary ray while the light transmitted through the first birefringent plate as the extraordinary ray is transmitted therethrough as an ordinary ray, and the resulting ordinary ray and extraordinary ray are transmitted in the lens and completely reflected point-symmetrically by the total reflection member at a single point; the ordinary ray and the extraordinary ray which are completely reflected by the total reflection member are transmitted in the fourth birefringent plate and then re-transmitted in the Faraday rotator; when the ordinary ray and the extraordinary ray are finally transmitted through the second birefringent plate, the light transmitted through the fourth birefringent plate as the ordinary ray is transmitted therethrough as an extraordinary ray, while the light transmitted through the fourth birefringent plate as the extraordinary ray is transmitted therethrough as an ordinary ray; further the optical isolator has going-returning paths wherein the optical paths of an ordinary ray and an extraordinary ray are matched when the ordinary ray and the extraordinary ray are transmitted through the second birefringent plate; the optical path length from a center of polarization plane of the ordinary ray transmitted in the lens from the third birefringent element to the single point on the total reflection member and the optical path length from a center of polarization plane of the extraordinary ray transmitted in the lens from the second birefringent element to the single point on the total reflection member is set equal; and the first birefringent element has a crystal axis orientation with respect to an element surface normal direction and an element surface normal direction thickness, which is necessary for setting the isolated width difference and the polarization mode dispersion between the ordinary ray and extraordinary ray produced in the second birefringent element at less than 0.5 μm and 0.05 ps, respectively.

Further, the invention as defined in claim 4 of the application is the optical isolator wherein an angle of the crystal axis with respect to the element surface normal direction of the second birefringent element is set at 47.8 degrees and an angle of the crystal axis with respect to the element surface normal direction of the first birefringent element is set at 59 degrees.

Further, the invention as defined in claim 5 of the application is the optical isolator wherein the thickness of the first birefringent element in the element surface normal direction is set at a value greater than 105 μm.

Further, the invention as defined in claim 6 of the application is the optical isolator wherein the lens is a GRIN lens and a total reflection film is integrally formed on an end face of the lens as the total reflection member.

Further, the invention as defined in claim 7 of the application is an optical device comprising: the aforementioned optical isolator and a plurality of optical fibers, which are optically coupled to the optical isolator.

Further, the invention as defined in claim 8 of the application is the optical device wherein a light inlet/outlet end of the optical fiber is formed to be inclined.

Further, the invention as defined in claim 9 of the application is the optical device wherein an allowable bending radius of the optical fiber is set at 15 mm or less.

Further, the invention as defined in claim 10 of the application is the optical device wherein the optical fiber is an expanded core optical fiber.

EFFECT OF THE INVENTION

According to the optical isolator of the invention, it is possible to limit the kinds of optical devices which constitute the optical isolator only to a birefringent element; a Faraday rotator; and a lens and a total reflection member. Thus, the optical elements such as a half-wave plate and a glass plate which have been necessary for conventional optical isolators having going-returning optical paths can be eliminated. Consequently, an optical isolator structure having optical going paths can be achieved, wherein the kinds and the number of the optical elements used for constituting the optical isolator are decreased, as a result of which the manufacturing process and manufacturing cost thereof can be reduced.

Further, the optical isolator according to the present invention is constituted only by optical elements indispensable for providing the optical isolator function, so that the optical path design is simplified and the structure of the optical isolator can be simplified and reduced in size and cost. Furthermore, since one of the first and second birefringent elements, which are indispensable optical elements for providing the optical isolator function, is imparted with the PDL and PMD reduction function, it is also possible to further enhance the property of the optical isolator.

For the optical isolators having going-returning optical paths using reflection, light is transmitted through the same optical element twice, so that the PMD and PDL which occur in the single optical element are doubled and affected to the light outgoing from the optical isolator. In contrast, for the optical isolator of the invention, the PMD and PDL which occur in the going optical path are reduced before the light is reflected by the total reflection member, so that it can be prevented that the returning optical path is severely affected by the PMD and PDL. Further, the PMD and PDL which occur in the returning optical path are also reduced by transmitting the light through the first birefringent element or second birefringent element, which is subjected to correction of the crystal axis orientation and correction of the thickness in the direction of the normal to the element. For this reason, it becomes possible to reduce the PMD and PDL of the propagating light can be reduced to a desired numeral level until the propagating light is caused to enter the optical fiber on the light incident side.

In addition, when the PDL and PMD reduction function is imparted to the first or second birefringent element, a preference for correcting the PDL or for correcting PMD can be determined only by changing the crystal axis angle and the thickness in the element surface normal direction of the element of any one of the first and second birefringent elements. Thus, the aforementioned preference can be easily changed depending on the application and required features of the respective optical isolators so that application of the optical isolators can be expanded without difficulty.

When priority is given to the correction to minimize a isolated width which directly influences the PDL effect of the optical isolator, the light rays of the two paths can be completely reflected at a substantially single point on the total reflection member. Thus, the difference in optical path length between the two optical paths within the lens associated with the total reflection can be substantially eliminated. Accordingly, the PDL which occurs between the light rays of the two optical paths, i.e., the going-returning optical paths, within the lens can be reduced to a desired numeral level.

Further, in the forward direction optical path, the crystal axis orientations of the first and second birefringent elements and the thicknesses of the first and second birefringent elements in the element surface normal direction are set such that the center positions of the respective polarization planes of the ordinary ray and extraordinary ray after transmitting through the first and second birefringent elements are equi-spaced from a single point on the total reflection member. Therefore, the optical path lengths of the ordinary and extraordinary rays to the single point within the lens can be made equal. Thus, it is possible to substantially eliminate the difference in optical path length between the ordinary ray and the extraordinary ray within the lens associated with the total reflection by the total reflection member, which provides better effect in reducing the PDL.

In association with the fact that light is sent forth and back by the going-returning optical paths, it is of course that the dimension in the optical path direction of the optical isolator is reduced, so that it becomes also possible to meet the request for reduction in size of the optical isolator. Besides, since the optical fibers can be arranged on only one side of the optical isolator, an area for routing optical fibers within the amplifier can be reduced when the optical isolator is incorporated in the amplifier, as a result of which the amplifier can be reduced in size.

In addition, since the going-returning optical paths are employed, the number of lenses can be reduced to one, whereby a step of position adjustment between the optical fibers and lens (an alignment step during construction) can be deleted.

By using a GRIN lens as the lens and integrally forming as the total reflection member a total reflection film on the end face of the lens, the going-returning optical paths based on point-symmetric reflection can be designed easily, and the dimension in the optical path direction of the optical isolator can be made shorter.

Furthermore, in an optical device comprising the aforementioned optical isolator and a plurality of optical fibers optically coupled to the optical isolator, a light inlet/outlet end of the optical fiber is formed to be inclined, whereby the reflection return light from the light inlet/outlet surface of the optical device to the optical fiber can be prevented even if the optical device of the optical isolator is not disposed in an inclined manner with respect to a light propagating optical path or even if the aforementioned optical device is formed in a wedge shape.

Furthermore, by using an optical fiber whose allowable bending radius of the optical fiber is set at 15 mm or less, the bending loss of the optical fiber can be reduced. Thus, the optical fiber can be set in a compact winding condition, whereby the area required for routing the optical fiber within the amplifier can be reduced, which contributes to reduction in size of the amplifier.

Further, by using an expanded core optical fiber as the optical fiber, a loss caused by misalignment between the optical fibers can be suppressed, whereby when the optical fibers are positioned with respect to the optical isolator, the tolerance in the horizontal direction (X-axis direction) and vertical direction (Y-axis direction) can be reduced.

Figure 1:
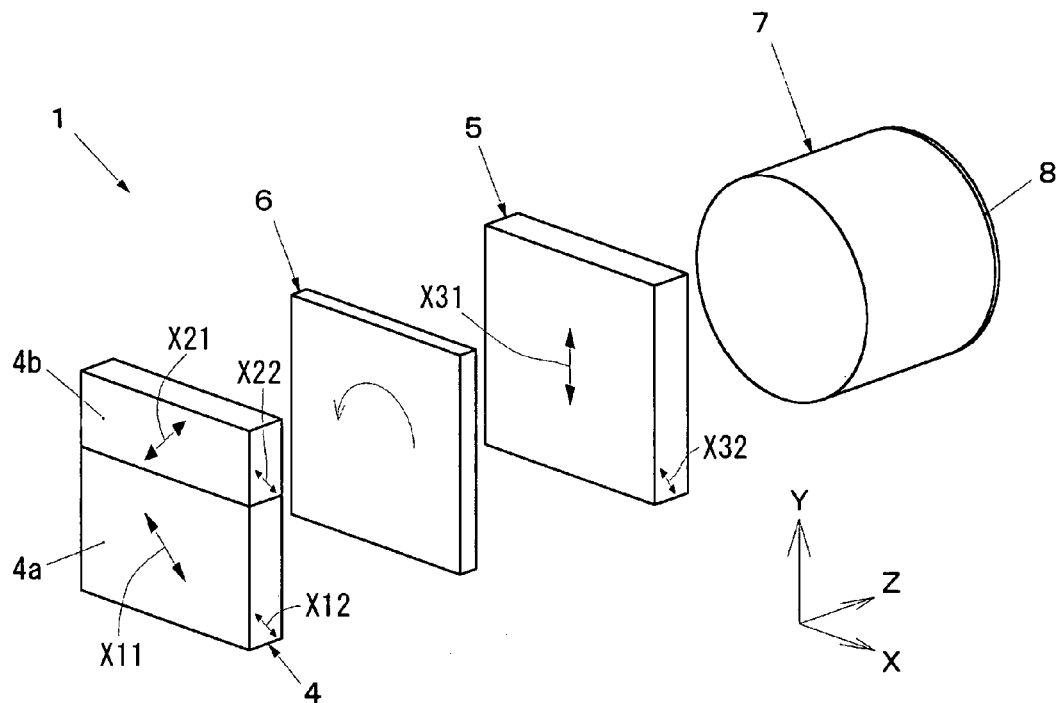
FIG. 1 is a schematic perspective view showing an optical isolator according to a first embodiment of the invention.

REFERENCE NUMERALS 1, 1' Optical isolator
2, 3 Optical fiber
4 First birefringent element
4a First birefringent plate
4b Second birefringent plate
5, 5' Second birefringent element
5a Third birefringent plate
5b Fourth birefringent plate
6 Faraday rotator
7 Lens
8 Total reflection film
   11-18 Light

BEST MODE FOR CARRYING OUT THE INVENTION

First Embodiment

Figure 2:
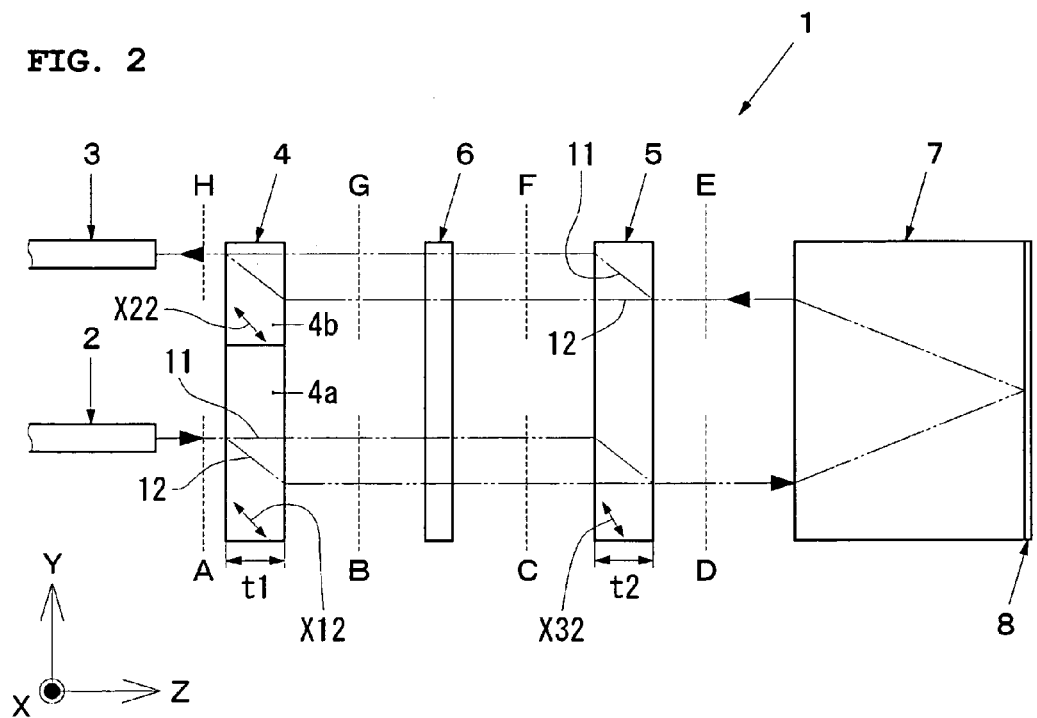
FIG. 2 is a side view of an optical device comprising the optical isolator in FIG. 1 and a plurality of optical fibers optically coupled to the optical isolator showing the optical paths when light propagates in the forward direction.
Figure 3:
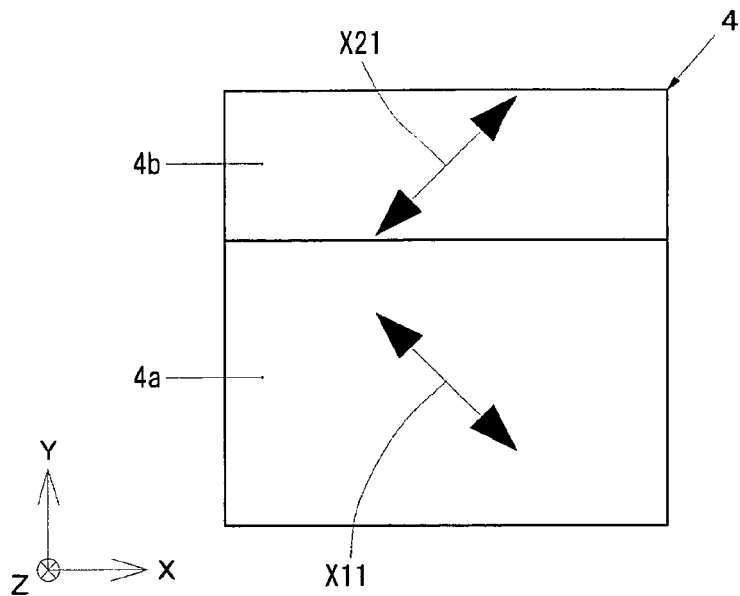
FIG. 3 is a plan view of a first birefringent element, which is a constituent component of the optical isolator in FIG. 1, viewed from the side facing the optical fibers.

A first embodiment of the present invention will be described in detail below with reference to FIG. 1 to FIG. 6. FIG. 1 is a schematic perspective view showing an optical isolator according to a first embodiment of the invention; FIG. 2 is a side view of an optical device comprising the optical isolator in FIG. 1 and a plurality of optical fibers optically coupled to the optical isolator, showing optical paths when light propagates in the forward direction; FIG. 3 is a plan view of a first birefringent element which is a constituent component of the optical isolator in FIG. 1, viewed from the side facing the optical fibers; and FIG. 4 is a side view of the optical device, showing optical paths when light propagates in the reverse direction.

As shown in FIG. 1 to FIG. 4, an optical isolator 1 is constituted by a first birefringent element 4 (rutile type crystal), a second birefringent element 5 (rutile type crystal), a Faraday rotator 6, a magnet (not shown) for magnetically saturating the Faraday rotator 6, a lens 7, and a total reflection member 8. The first birefringent element 4, the second birefringent element 5, and the Faraday rotator 6 are each formed in a plate shape. Further, the optical isolator 1 and two optical fibers 2 and 3 are arranged to be optically coupled to each other. Thus, an optical device is provided.

Figure 4:
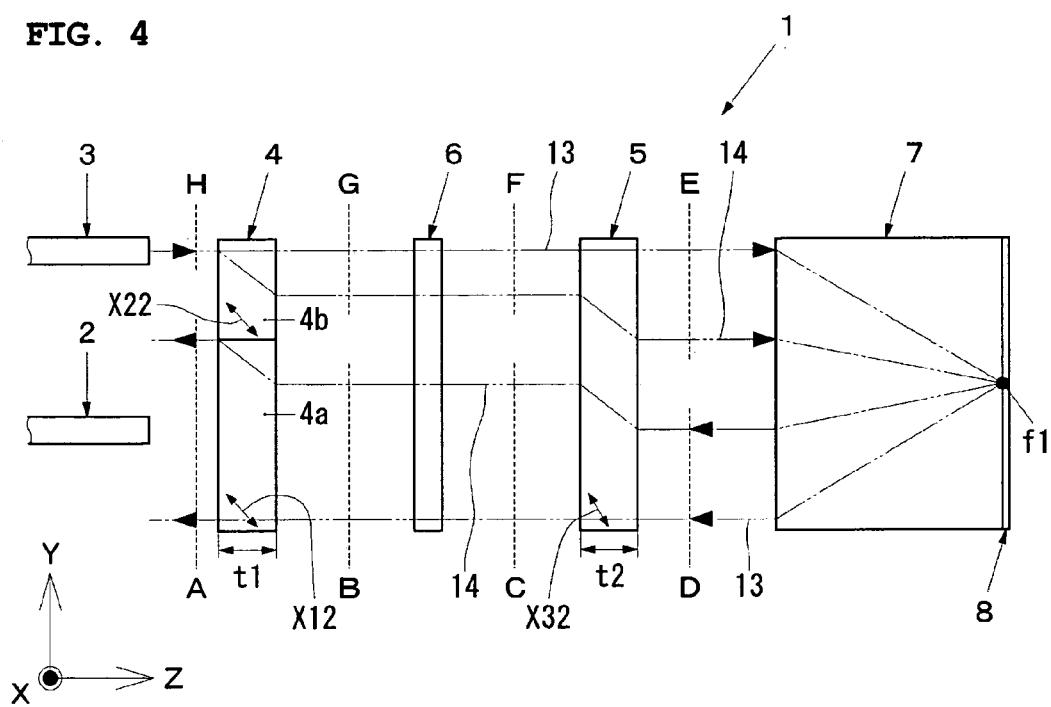
FIG. 4 is a side view of the optical device showing optical paths when light propagates in the reverse direction.

More particularly, in FIG. 2 and FIG. 4, the plural optical fibers 2 and 3 are arranged in parallel so as to be spaced apart 250 μm from each other in the Y-axis direction in the drawings, and the light inlet/outlet end of each optical fiber is formed to be inclined by polishing. As shown in FIG. 3, the first birefringent element 4 is made up of two birefringent plates (a first birefringent plate 4a and a second birefringent plate 4b), which are arranged such that the respective crystal axes X11 and X21 orientations are different by 90 degrees to each other when viewed from the light incident side in the forward direction (i.e., viewed from the light outgoing direction from the optical fiber 2). Supposing the horizontal direction parallel to the X-axis in FIG. 3 is 0 degree, the crystal axis X11 orientation of the first birefringent plate 4a as viewed from the light incident side is set to be inclined at a 135 degree angle from the 0 degree. Accordingly, the crystal axis X21 orientation of the second birefringent plate 4b is set to be inclined at a 45 degree angle from the 0 degree such that the crystal axis X21 orientation is different by 90 degrees from the 135 degrees. An antireflection film is provided on the light inlet/outlet surfaces of the first and second birefringent elements 4 and 5.

When the first birefringent plate 4a and the second birefringent plate 4b are adhered to each other, the boundary thereof should be disposed between the optical fibers 2 and 3. Further, the aforementioned boundary should be positioned in consideration of the dispersion of light launched in and outgoing from the optical fibers 2 and 3 such that the light outgoing from the optical fiber 2 is transmitted through the first birefringent plate 4a only and the light transmitted in or outgoing from the optical fiber 3 is transmitted through the second birefringent plate 4b only.

The Faraday rotator 6 is made up of magneto-optics crystal such as garnet single crystal having the Faraday effect. The thickness of the Faraday rotator 6 is set such that it has a rotation angle of 45 degrees when magnetically saturated. This Faraday rotator 6 is disposed between the aforementioned two birefringent elements 4 and 5, and the rotation direction of its incident light polarization plane is set to be the counterclockwise direction when viewed along Z-axis from the incident side of the light which is transmitted through the Faraday rotator 6 and propagated to the second birefringent element 5, i.e. the optical fiber 2 side.

In FIG. 1, the second birefringent element 5 is located on a side of the Faraday rotator 6 opposite the first birefringent plate 4a. The crystal axis X31 orientation of the second birefringent element 5 viewed from the light incoming side (along the Z-axis direction) is set to be different by 45 degrees to the aforementioned crystal axis X11 orientation. Supposing the Y-axis direction, i.e., the horizontal direction, is 0 degree, the crystal axis X31 orientation is set to be inclined at a 90 degree angle with respect to the 0 degree, by way of example, that is, set to be different by 45 degrees to the aforementioned 135 degrees.

The lens 7 is a rod-shaped graded refractive index (GRIN: GRadient INdex) lens with a refractive index which varies continuously such that the closer to the center of the lens 7 (the optical axis of the lens 7), the larger the refractive index is. Further, a total reflection film is integrally formed on one end face of the lens 6 as the total reflection member 8 (hereinafter referred to as "total reflection film 8").

Figure 5:
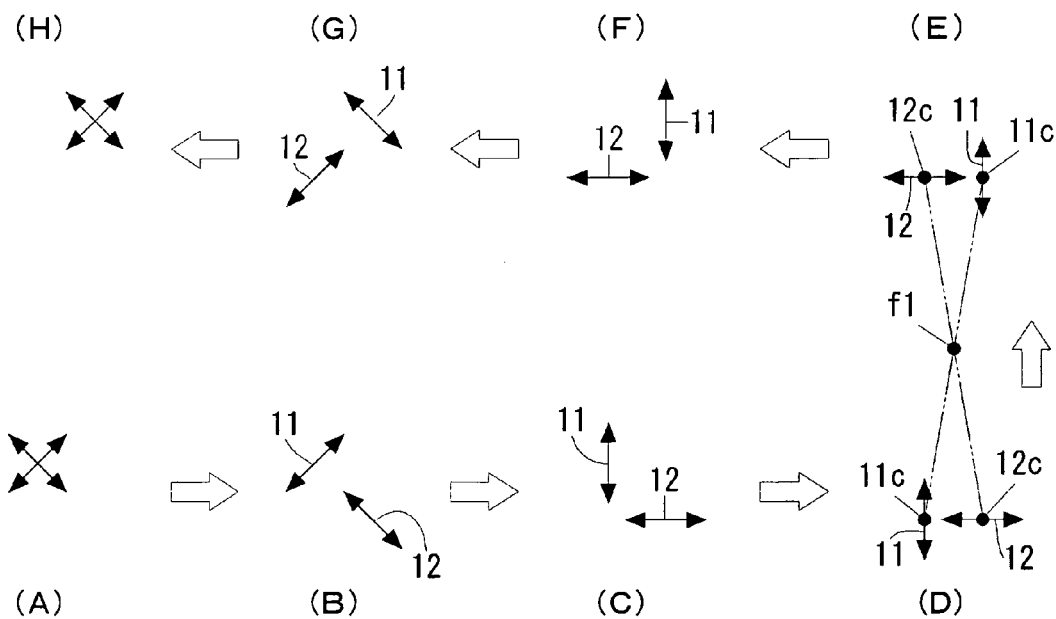
FIG. 5 shows views illustrating polarization states of the light propagating in the forward direction in the optical isolator in FIG. 1.
Figure 6:
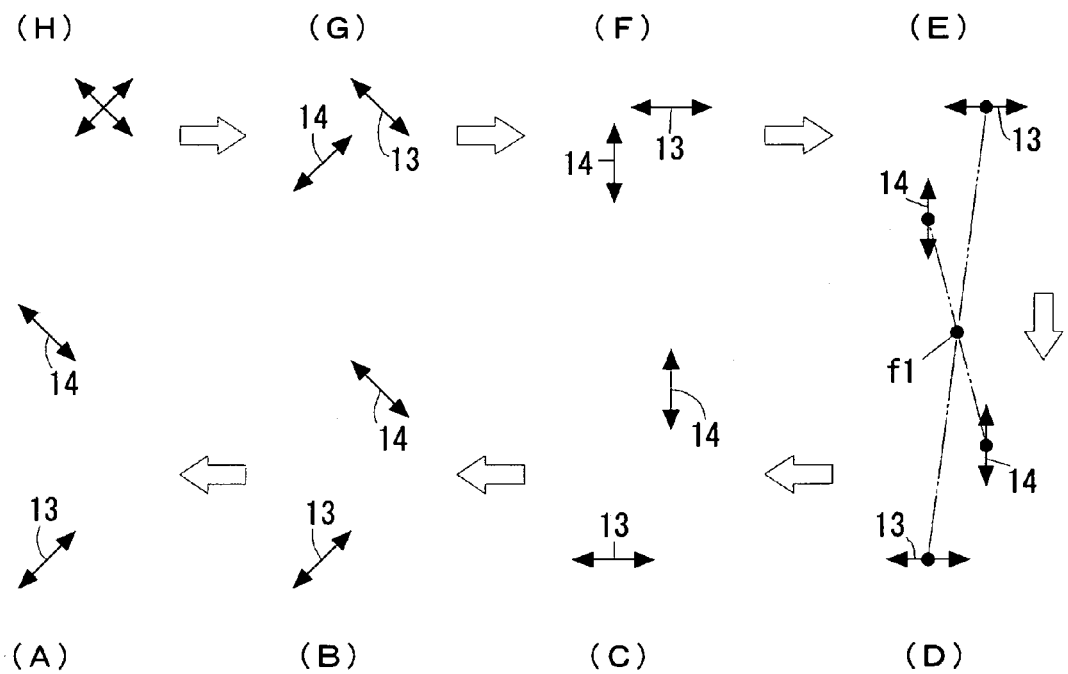
FIG. 6 shows views illustrating the polarization states of the light propagating in the reverse direction in the optical isolator in FIG. 1.

Operations of the optical isolator 1 and the optical device, which are constructed as described above, will be described in the following. FIG. 5 shows views illustrating polarization states of the light propagating in the forward direction in the optical isolator 1, and FIG. 6 shows views illustrating polarization states of the light propagating in the reverse direction in the optical isolator 1. In FIG. 5, (A) to (H) respectively, represent the polarization planes of the light, which are shown in the section taken along the broken lines A to H in FIG. 2. In FIG. 6, (A) to (H), respectively, represent the polarization planes of the light, which are shown in the section taken along the broken lines A to H in FIG. 4. Here, each polarization state of the light represents the polarization plane of the propagating light as viewed from the side of the optical fibers 2 and 3 along the Z-axis. Further, as used herein, the clockwise rotation of the polarization plane is referred to as right-handed rotation, and the counterclockwise thereof is referred to as left-handed rotation. The behavior of the light within the lens 7 is that schematically drawn at the center of the propagating light.

As used herein, the optical path from outgoing of the light from the optical fiber 2 or 3 to complete reflection by the total reflection film 8 is referred to as a "going path", while the optical path from the complete reflection of by the total reflection film 8 to incoming of the light to the optical fiber 2 or 3 is referred to as a "returning path", and these optical paths are referred to hereinafter collectively as a "going-returning optical paths". Furthermore, as used herein, a series of optical paths from outgoing from the optical fiber 2 to incoming in the optical fiber 3 is referred to as a "forward optical path", while a series of optical paths from outgoing from the optical fiber 3 to incoming in the optical fiber 2 is referred to as a "reverse optical path".

First, the forward optical path will be described. To begin with, unpolarized light (FIG. 5(A)) is transmitted from the optical fiber 2 to the first birefringent plate 4a. Among the polarization planes of the light, light 12 which is a polarization plane parallel to the crystal axis X12 becomes an extraordinary ray. The optical path of the light 12 is shifted diagonally downward as shown in FIG. 2 (FIG. 5(B)). On the other hand, the polarization plane of light 11 is not parallel to the crystal axis X11, so that it is not shifted and travels straight ahead as an ordinary ray. Thus, the unpolarized light is split into the light 11 and the light 12 by the first birefringent plate 4a and the light 11 and the light 12 propagate optical paths different to each other. The rotation direction of the Faraday rotator 6 is set left-handed rotation when the crystal axis X11 orientation is 135 degrees as described above. Thus, the respective polarization planes of the light 11 and light 12 which are transmitted in the Faraday rotator 6, are rotated about 45 degrees in the counterclockwise direction (see FIG. 5(C)).

Then, the light 11 and the light 12 are transmitted in the second birefringent element 5. As described above, the crystal axis X31 orientation is set to be different by 45 degrees with respect to the crystal axis X11 orientation. This relative angle difference of 45 degrees is the same value as that of the rotation angle of the Faraday rotator 6. Thus, the polarization plane of the light 11 rotated in the counterclockwise direction by the Faraday rotator 6 becomes parallel to the crystal axis X31 orientation. Therefore, when the light 11 and the light 12 having the polarization plane shown in FIG. 5(C) enter the second birefringent element 5, the light 11 which is transmitted through the first birefringent plate 4a as an ordinary ray now becomes an extraordinary ray, so that the light 11 is shifted diagonally downward as shown in FIG. 2 (see FIG. 5(D)). On the other hand, the polarization plane of the light 12 which is transmitted through the first birefringent plate 4a as an extraordinary ray, is not parallel to the crystal axis X31 so that it is not shifted and travels straight ahead as an ordinary ray.

As described above, the crystal axis X11 orientation and the crystal axis X31 orientation, and the element surface normal direction thickness t1 of the first birefringent element 4 and the element surface normal direction thickness t2 of the second birefringent element 5 are set such that when the light 11 and the light 12 are transmitted through the first birefringent plate 4a and second birefringent element 5, they necessarily provide both polarization states of the ordinary ray and the extraordinary ray, respectively. Furthermore, in the forward direction, by setting the crystal axis X11 orientation and the crystal axis X31 orientation in consideration of shifting the extraordinary ray diagonally downward as shown in FIG. 2, it becomes possible to set the first birefringent plate 4a and the second birefringent element 5 such that the centers 11c and 12c of the polarization planes of the light 11 and light 12 after transmission are positioned at equi-distances from a single point f1 on the total reflection film 8 (i.e. the condition where the distance between the center 11c and the point f1 is equal to the distance between the center 12c and the point f1). The light 11 and the light 12 which are transmitted through the second birefringent element 5 are transmitted in the lens 7.

The light 11 and the light 12 which enter inside the lens 7 are gradually converged to the single point f1 on the surface of the total reflection film 8 and matched at the single point f1 and completely reflected point-symmetrically. As described above, the crystal axis X11 orientation and the crystal axis X31 orientation, and the element surface normal direction thickness t1 of the first birefringent element 4 and the element surface normal direction thickness t2 of the second birefringent element 5 are set such that the distance between the center 11c and the point f1 becomes equal to the distance between the center 12c and the point f1, so that the distance between the center 11c and the point f1 and the distance between the center 12c and the point f1 after total reflection become equal to each other. The light 11 and the light 12 completely reflected and outgoing from the lens 7 (see FIG. 5(E)) are re-transmitted in the second birefringent element 5. Similar to the optical going path, in the second birefringent element 5, the polarization plane of the light 11 becomes parallel to the crystal axis X31 orientation, so that the light 11 becomes an extraordinary ray and is shifted diagonally upward as shown in FIG. 2 (see FIG. 5(F)). On the other hand, since the polarization plane of the light 12 is not parallel to the crystal axis X31 orientation, it is not shifted and travels straight ahead as an ordinary ray.

Then, the respective polarization planes of the light 11 and light 12 which are transmitted in the Faraday rotator 6, are rotated about 45 degrees in the counterclockwise direction (FIG. 5(G)). The light 11 and the light 12 are transmitted through the Faraday rotator 6 twice when propagating along the going-returning paths, so that each polarization plane is totally rotated 90 degrees in the counterclockwise direction compared with the polarization states (FIG. 5(B)) when outgoing from the first birefringent plate 4a. The light 11 and the light 12 with these polarization states are transmitted in the second birefringent plate 4b of the first birefringent element 4.

As described above, the crystal axis X21 orientation of the second birefringent plate 4b is set to be different by 90 degrees with respect to the crystal axis X12 orientation of the first birefringent plate 4a, and the polarization planes of the light 11 and the light 12 transmitted through the Faraday rotator 6 when propagating along the optical returning path are each totally rotated 90 degrees in the counterclockwise direction compared with the polarization state (FIG. 5(B)) when outgoing from the first birefringent plate 4a. Therefore, the light 12 which was the extraordinary ray when transmitted through the first birefringent plate 4a is also the extraordinary ray in the optical returning path, so that, as shown in FIG. 2, the light 12 transmitted in the second birefringent plate 4b is shifted diagonally upward (see FIG. 5(H)). On the other hand, the light 11 is an ordinary ray within the second birefringent plate 4b, so that it travels straight ahead through the second birefringent plate 4b. In this way, the light 12 which was transmitted through the second birefringent element 5 as an ordinary ray after completely reflected by the total reflection film 8 is transmitted as an extraordinary ray, while the light 11 which was transmitted through the second birefringent element 5 as an extraordinary ray after completely reflected by the total reflection film 8 is transmitted as an ordinary ray. The optical paths of the light 11 and the light 12 are matched when transmitted through the second birefringent plate 4b by the fact that they are shifted. As a result, the light is optically coupled to the optical fiber 3 with the original incident light state, i.e. the state that the ordinary ray and the extraordinary ray are matched. Further, since the light 11 and the light 12 are condensed by the lens 7, they are effectively optically-coupled to the optical fiber 3 with an insertion loss of as low as 0.5 dB.

The optical path in the reverse direction will now be described. When unpolarized light outgoing from the optical fiber 3 is launched (FIG. 6(H)), the light which enters the second birefringent plate 4b is split into light 13 that is an ordinary ray and light 14 that is an extraordinary ray, and the light 14 is shifted diagonally downward as shown in FIG. 4 (see FIG. 6(G)), so that the light 13 and the light 14 propagate along optical paths which are different to each other. Further, when transmitted through the Faraday rotator 6, each polarization plane is rotated about 45 degrees in the counterclockwise direction (see FIG. 6(F)), and then the light 13 and the light 14 are transmitted in the second birefringent element 5. In the second birefringent element 5, the polarization plane of the light 14 becomes parallel to the crystal axis X31 orientation, so that the light 14 becomes an extraordinary ray and is shifted diagonally downward as shown in FIG. 4 (see FIG. 6(E)).

Then the light 13 and the light 14 are transmitted in the lens 7, wherein they are gradually converged to the single point f1 on the surface of the total reflection film 8 and matched at the single point f1 and completely reflected point-symmetrically. Then, the light 13 and the light 14 from the lens 7 are re-transmitted in the second birefringent element 5 (see FIG. 6(D)). The light 14 which enters the second birefringent element 5 propagates therethrough as an extraordinary ray, so that it is shifted diagonally upward as shown in FIG. 4 (see FIG. 6(C)), and re-transmitted in the Faraday rotator 6.

Then, the respective polarization planes of the light 13 and light 14 which are transmitted in the Faraday rotator 6, are rotated about 45 degrees in the counterclockwise direction (FIG. 6(B)). Thus, the respective polarization planes (FIG. 6(B)) of the light 13 and light 14 which are re-emerged from the Faraday rotator 6 provides polarized states wherein the polarization planes are rotated 90 degrees in the counterclockwise direction compared with the states (FIG. 6(G)) when outgoing from the second birefringent plate 4b. The light 13 and the light 14 with these polarization states are transmitted in the first birefringent plate 4a of the first birefringent element 4.

As described above, the crystal axis X11 orientation of the first birefringent plate 4a is set to be different 90 degrees with respect to the crystal axis X21 orientation of the second birefringent plate 4b, and the polarization planes of the light 13 and the light 14 transmitted through the Faraday rotator 6 when propagating along the optical returning path are each totally rotated 90 degrees in the counterclockwise direction compared with the polarization state (FIG. 6(G)) when outgoing from the second birefringent plate 4b. Therefore, the light 14 which was the extraordinary ray when transmitted through the second birefringent plate 4b is also the extraordinary ray in the optical returning path, so that, as shown in FIG. 4, the light 14 is shifted diagonally upward (see FIG. 6(A)). On the other hand, the light 13 is an ordinary ray within the first birefringent plate 4a so that it travels straight ahead through the first birefringent plate 4a. In this way, the optical paths of the light 13 and the light 14 are offset from each other and not matched and both of them do not enter the optical fiber 2.

As described above, the optical isolator 1 can obtain an optical isolator function wherein the light transmitted from the optical fiber 2 is optically coupled to the optical fiber 3 while the light transmitted from the optical fiber 3 is not optically coupled to the optical fiber 2. In order to ensure this optical isolator function, the first and second birefringent elements 4 and 5 must be reciprocal elements. In addition, the Faraday rotator 6 must be a nonreciprocal element.

According to the particular embodiment, it is possible to limit the kinds of optical devices which constitute the optical isolator 1 only to a birefringent element; a Faraday rotator; and a lens and a total reflection member. Thus, a half-wave plate and a glass plate which have been necessary for conventional optical isolators having optical paths through which light is sent forth or back can be eliminated. Consequently, an optical isolator structure having optical paths through which light is sent forth or back can be achieved, wherein the kinds and the number of the optical elements used for constituting the optical isolator are decreased, as a result of which the manufacturing process and manufacturing cost thereof can be reduced.

Of course, similar to the conventional optical isolators having going-returning paths, the dimension in the optical path direction of the optical isolator is reduced, so that it is also possible to meet the request for reduction in size. Besides, since the optical fibers 2, 3 can be arranged on only one side of the optical isolator 1, an area for routing optical fibers within the amplifier can be reduced when the optical isolator is incorporated in the amplifier, as a result of which the amplifier can be reduced in size.

Further, since the going-returning optical paths are employed, the number of lenses can be reduced to one, whereby a step of position adjustment between the optical fibers and lens (an alignment step during construction) can be deleted.

In the following, a scheme for reducing the PMD and PDL of the light 11 and light 12 based on the refractive index difference between the first and second birefringent elements 4 and 5 will be described. First, an effective refractive index nne1 of an extraordinary ray in the first birefringent element 4 will be given by Formula 1.

$$nne1 = \frac{no \cdot ne}{\left(no^2 \cdot \sin\left(\theta r \cdot \frac{\pi}{180}\right)^2 + ne^2 \cdot \cos\left(\theta r \cdot \frac{\pi}{180}\right)^2\right)^{\frac{1}{2}}}$$ [Formula 1]

In Formula 1, no represents an ordinary index; ne represents an extraordinary index; no is 2.453; and ne is 2.709. Further, as will be understood from Formula 1, nne1 depends on an angle θr between the crystal axis of the first or second birefringent plate 4a, 4b and the wave normal direction of the extraordinary ray. Assuming that an element surface-normal thickness t1 of the first birefringent element 4 is 200 μm, an isolated width So1 of an ordinary ray from the element surface normal of the first birefringent element 4 when the ordinary ray is transmitted through the first birefringent element 4 having a thickness of t1 is given by Formula 2.

$$So1 = t1 \cdot \tan\left(\theta o \cdot \frac{\pi}{180}\right) \cdot \cos\left(\alpha \cdot \frac{\pi}{180}\right)$$ [Formula 2]

In Formula 2, θo is an effective ray angle of the ordinary ray (an angle between the ray direction of the ordinary ray and the aforementioned element surface normal) and expressed by the following formula.

$$\theta o = \frac{180}{\pi} \cdot \sin^{-1}\left(\frac{\sin\left(\alpha \cdot \frac{\pi}{180}\right)}{no}\right)$$ [Formula 3]

In Formula 3, α is a light incident angle to the element surface normal. When an inclination angle to the core axis of the light inlet/outlet end of the optical fibers 2 and 3 is set at 12 degrees, α is set at 5.5 degrees.

Further, the isolated width Se1 of the extraordinary ray from the aforementioned element surface normal when the extraordinary ray is transmitted through the first birefringent element 4 having a thickness t1 is given by the following formula.

$$Se1 = t1 \cdot \tan\left(\theta e1 \cdot \frac{\pi}{180}\right) \cdot \cos\left(\alpha \cdot \frac{\pi}{180}\right)$$ [Formula 4]

In Formula 4, θe1 is an angle between the ray direction of the extraordinary ray and the aforementioned element surface normal and expressed by the following formula.

$$\theta e1 = \theta 1 - \theta ec$$ [Formula 5]

In Formula 5, θec is an angle between the extraordinary ray and the crystal axis of the first or second birefringent plate 4a, 4b which the extraordinary ray enters, and expressed by the following formula.

$$\theta ec = \frac{180}{\pi} \cdot \tan^{-1}\left(\frac{no^2}{ne^2} \cdot \tan\left(\theta r \cdot \frac{\pi}{180}\right)\right)$$ [Formula 6]

In Formula 6, θr is expressed by the following formula.

$$\theta r = \frac{180}{\pi} \cdot \tan^{-1}\left(\frac{-b + (b^2 - 4 \cdot a \cdot c)^{\frac{1}{2}}}{2 \cdot a}\right)$$ [Formula 7]

In Formula 7, three coefficients a, b, and c are expressed by the following three formulas.

$$a = no^2 \cdot ne^2 \cdot \cos\left(\theta 1 \cdot \frac{\pi}{180}\right)^2 - no^2 \cdot \sin\left(\alpha \cdot \frac{\pi}{180}\right)^2$$ [Formula 8]

$$b = -2 \cdot no^2 \cdot ne^2 \cdot \cos\left(\theta 1 \cdot \frac{\pi}{180}\right) \cdot \sin\left(\theta 1 \cdot \frac{\pi}{180}\right)$$ [Formula 9]

$$c = no^2 \cdot ne^2 \cdot \sin\left(\theta 1 \cdot \frac{\pi}{180}\right)^2 + \sin\left(\alpha \cdot \frac{\pi}{180}\right)^2 \cdot -1 \cdot ne^2$$ [Formula 10]

In Formulas 8, 9 and 10, θ1 represents an angle, of the first or second birefringent plate 4a or 4b, between each element surface normal and the crystal axis (corresponding to the crystal axis X12 or X22 orientation shown in FIG. 1, FIG. 2 and FIG. 4). For this angle, 47.8 degrees are optimum because the isolated width Soe1 (mentioned later) can be maximized while minimizing the element surface normal direction thickness t1. Thus, the total isolated width Soe1 of the ordinary ray and extraordinary ray with respect to the incident light ray direction of the first birefringent element 4 is expressed by the following formula.

$$Soe1 = So1 + Se1$$ [Formula 11]

According to the calculation by substituting the aforementioned respective parameter values into Formula 11, Soe1=20.119 μm is derived.

Further, an angle θed1 between the extraordinary ray wave normal direction and the aforementioned element surface normal direction is expressed by the following formula.

$$\theta ed1 = \theta r - \theta 1$$ [Formula 12]

Hence, an optical path length difference d1 between the ordinary ray and extraordinary ray produced by the first birefringent element 4 is expressed by the following formula.

$$d1 = t1 \cdot \left(\frac{nne1}{\cos\left(\theta ed1 \cdot \frac{\pi}{180}\right)} - \frac{no}{\cos\left(\theta o \cdot \frac{\pi}{180}\right)}\right) \cdot \cos\left(\alpha \cdot \frac{\pi}{180} - \theta ed1 \cdot \frac{\pi}{180}\right)$$ [Formula 13]

According to the calculation by substituting the aforementioned respective parameter values into Formula 13, d1=28.031 μm is derived. Further, the polarization mode dispersion PMD1 produced by this optical path length difference d1 is expressed by the following formula.

$$PMD1 = \frac{d1}{v} \cdot 10^6 \qquad \text{[Formula 14]}$$

According to the calculation, PMD1=0.094 ps is derived. In Formula 14, v is velocity of light, supposed as v=299792458 m/s.

A scheme of the invention for reducing the PMD and PDL between the light 11 and the light 12 produced in the first birefringent element 4 to desired numeral levels is to set, depending on the values of the aforementioned PMD and PDL, the element surface normal direction thickness t2 of the second birefringent element 5 and the crystal axis X32 orientation with respect to the element surface normal direction. In this manner, the PMD and PDL between the light 11 and light 12 produced in the first birefringent element 4 are reduced to desired numeral levels when the light 11 and light 12 are transmitted through the second birefringent element 5.

Then, an isolated width Soe2 and a polarization mode dispersion PMD2 are determined in the case where the second birefringent element 5 is not subjected to correction of the crystal axis orientation and correction of the element surface normal direction thickness for reducing the PMD and PDL to desired numeral levels. The effective refractive index nne1 of an extraordinary ray in the second birefringent element 5 will be given by Formula 1 mentioned above.

Based on the difference in isolated direction of the extraordinary ray between the first birefringent plate 4a and the second birefringent element 5 in association with the crystal axis X11 orientation and the crystal axis X31 orientation, the element surface normal thickness t2 of the second birefringent element 5 is set at about 141 μm which is $1/(\sqrt{2})$ times as large as the aforementioned t1. The shift amount So2 of the extraordinary ray from the element surface normal of the second birefringent element 5 when the ordinary ray is transmitted through the second birefringent element 5 having a thickness of t2 is expressed by Formula 15.

$$So2 = t2 \cdot \tan\left(\theta o \cdot \frac{\pi}{180}\right) \cdot \cos\left(\alpha \cdot \frac{\pi}{180}\right) \qquad \text{[Formula 15]}$$

Further, the angle between the ray direction of the ordinary ray and the aforementioned element surface normal is the same as θo expressed by Formula 3 mentioned above. In addition, the light incident angle with respect to the aforementioned element surface normal is set at 5.5 degrees which is the same as the aforementioned α.

Furthermore, the isolated width Se2 of the extraordinary ray from the aforementioned element surface normal when the extraordinary ray is transmitted through the second birefringent element 5 having a thickness t2 is given by the following formula.

$$Se2 = t2 \cdot \tan\left(\theta e1 \cdot \frac{\pi}{180}\right) \cdot \cos\left(\alpha \cdot \frac{\pi}{180}\right) \qquad \text{[Formula 16]}$$

Further, the angle between the ray direction of the extraordinary ray and the aforementioned element surface normal is the same as θe1 expressed by Formula 5 mentioned above. Furthermore, the angle between the extraordinary ray and the crystal axis of the second birefiringent element 5 that the extraordinary ray enters is the same as θec expressed by Formula 6 mentioned above. The angle between the crystal axis of the second birefiringent element 5 and the extraordinary ray wave normal direction is the same as θr expressed by Formula 7 mentioned above, and three coefficients a, b and c are similarly expressed by Formula 8, Formula 9 and Formula 10 mentioned above, so that the descriptions thereof will not be given here.

First, to consider the case where the second birefringent element 5 is arranged such that its crystal axis orientation is directed to be the same as that of the first birefringent element 4, the angle between the element surface normal and crystal axis (crystal axis X32 orientation) of the second birefringent element 5 is set at 47.8 degrees which is the same as the aforementioned θ1. Thus, the total isolated width Soe2 of the ordinary ray and extraordinary ray with respect to the incident light ray direction of the second birefringent element 5 is expressed by the following formula.

$$Soe2 = So2 + Se2 \qquad \text{[Formula 17]}$$

According to the calculation by substituting the aforementioned respective parameter values into Formula 17, Soe2=14.184 μm is derived.

Further, the angle between the extraordinary ray wave normal direction and the aforementioned element surface normal is the same as θed1 expressed by Formula 12 mentioned above. Hence, an optical path length difference d2 between the ordinary ray and extraordinary ray produced by the second birefringent element 5 is expressed by the following formula.

$$d2 = t2 \cdot \left(\frac{nne1}{\cos\left(\theta ed1 \cdot \frac{\pi}{180}\right)} - \frac{no}{\cos\left(\theta o \cdot \frac{\pi}{180}\right)}\right) \cdot \cos\left(\alpha \cdot \frac{\pi}{180} - \theta ed1 \cdot \frac{\pi}{180}\right) \qquad \text{[Formula 18]}$$

According to the calculation by substituting the aforementioned respective parameter values into Formula 18, d2=19.762 μm is derived. Further, the polarization mode dispersion PMD2 produced by this optical path length difference d2 is expressed by the following formula.

$$PMD2 = \frac{d2}{v} \cdot 10^6 \qquad \text{[Formula 19]}$$

According to the calculation, PMD2=0.066 ps is derived.

As described above, the element surface normal thickness t2 of the second birefringent element 5 is set at the value which is $1/(\sqrt{2})$ times as large as the aforementioned t1, a target isolated width Soe2T of the second birefringent element 5 is expressed by the following formula.

$$Soe2T = Soe1 \cdot \frac{1}{\sqrt{2}} \qquad \text{[Formula 20]}$$

Based on Soe1=20.119 μm, Soe2T=14.226 μm is derived. Thus, the difference S1 between the target isolated width Soe2T and the aforementioned Soe2 (isolated width difference from the first birefringent element 4) is derived as 0.042 μm.

The polarization mode dispersion difference PMD0 between the polarization mode dispersion PMD1 produced at the first birefringent element 4 and the polarization mode dispersion PMD2 produced at the second birefringent element 5 is expressed by the following formula.

$$PMD0 = PMD1 - PMD2 \quad \text{[Formula 21]}$$

According to the calculation, PMD0=0.028 ps is derived.

From the above, it is found that when the second birefringent element 5 is not subjected to the correction of the crystal axis orientation and the correction of the element surface normal direction thickness, the isolated width difference of 0.042 μm and the polarization mode dispersion difference of 0.028 ps are produced. Hence, it is understood that it suffices to determine the crystal axis orientation with respect to the element surface normal direction and the element surface normal direction thickness of the second birifringent element 5 such that the PMD2 of the second birifringent element 5 becomes about 0.094 ps by being delayed 0.028 ps and the isolated width becomes 14.23 μm.

Hereinafter, a scheme for reducing the PMD and PDL between the light 11 and light 12 produced in the first birefringent element 4 by subjecting the second birefringent element 5 to the correction of the crystal axis orientation and the correction of the element surface normal direction will be described. An effective refractive index nne1n of an extraordinary ray in the second birefringent element 5 which has been subjected to the correction of the crystal axis orientation and the correction of the element surface normal direction will be given by Formula 22.

$$nne1n = \frac{no \cdot ne}{\left(\left(no^2 \cdot \sin\left(\theta rn \cdot \frac{\pi}{180}\right)\right)^2 + ne^2 \cdot \cos\left(\theta rn \cdot \frac{\pi}{180}\right)^2\right)^{\frac{1}{2}}} \quad \text{[Formula 22]}$$

In Formula 22, no represents an ordinary index and ne represents an extraordinary index. As is known from Formula 1, nne1n depends on an angle θrn between the crystal axis of the second birefringent element 5 and an extraordinary ray wave normal direction. The element surface normal thickness t2 of the aforementioned second birefringent element 5 is made variable, so that the element surface normal thickness is newly represented as a variable tm. It is assumed that tm is variable in increments of 1 from the initial value of 145 μm to the terminal value of 165 μm. The isolated width So1m of the extraordinary ray from the element surface normal of the second birefringent element 5 when the ordinary ray is transmitted through the second birefringent element 5 having a thickness of tm is expressed by Formula 23.

$$So1m = tm \cdot \tan\left(\theta o \cdot \frac{\pi}{180}\right) \cdot \cos\left(\alpha \cdot \frac{\pi}{180}\right) \quad \text{[Formula 23]}$$

Further, the angle between the ray direction of the ordinary ray and the aforementioned element surface normal is same as θo expressed by Formula 3 mentioned above. In addition, the light incident angle with respect to the aforementioned element surface normal is set at 5.5 degrees which is the same as the aforementioned α.

Further, the isolated width Se1 (m, n) of the extraordinary ray from the aforementioned element surface normal when the extraordinary ray is transmitted through the second birefringent element 5 having a thickness tm is given by the following formula.

$$Se1(m, n) = tm \cdot \tan\left(\theta e2n \cdot \frac{\pi}{180}\right) \cdot \cos\left(\alpha \cdot \frac{\pi}{180}\right) \quad \text{[Formula 24]}$$

In Formula 24, θe2n is an angle between the ray direction of the extraordinary ray and the aforementioned element surface normal and expressed by the following formula.

$$\theta e2n = \theta n - \theta ecn \quad \text{[Formula 25]}$$

Further, θecn is an angle between the extraordinary ray and the crystal axis of the second birefringent element 5 and expressed by the following formula.

$$\theta ecn = \frac{180}{\pi} \cdot \tan^{-1}\left(\frac{no^2}{ne^2} \cdot \tan\left(\theta rn \cdot \frac{\pi}{180}\right)\right) \quad \text{[Formula 26]}$$

θrn is expressed by the following formula.

$$\theta rn = \frac{180}{\pi} \cdot \tan^{-1}\left(\frac{-bn + (bn^2 - 4 \cdot an \cdot cn)^{\frac{1}{2}}}{2 \cdot an}\right) \quad \text{[Formula 27]}$$

In Formula 27, three coefficients an, bn, and cn are expressed by the following three formulas.

$$an = no^2 \cdot ne^2 \cdot \cos\left(\theta n \cdot \frac{\pi}{180}\right)^2 - no^2 \cdot \sin\left(\alpha \cdot \frac{\pi}{180}\right)^2 \quad \text{[Formula 28]}$$

$$bn = -2 \cdot no^2 \cdot ne^2 \cdot \cos\left(\theta n \cdot \frac{\pi}{180}\right) \cdot \sin\left(\theta n \cdot \frac{\pi}{180}\right) \quad \text{[Formula 29]}$$

$$cn = no^2 \cdot ne^2 \cdot \sin\left(\theta n \cdot \frac{\pi}{180}\right)^2 + \sin\left(\alpha \cdot \frac{\pi}{180}\right)^2 - 1 \cdot ne^2 \quad \text{[Formula 30]}$$

θn is an angular variable between the element surface normal and the crystal axis of the second birefringent element 5 (corresponding to crystal axis X32 orientation in FIG. 1, FIG. 2 and FIG. 4), θn is a variable in increments of 0.1 from the initial value of 58.5 degrees to the terminal value 60.5. Thus, the total isolated width Soe2 (m, n) of the ordinary ray and extraordinary ray with respect to the incident light ray direction of the second birefringent element 5 is expressed by the following formula.

$$Soe2(m,n) = So1m + Se1(m,n) \quad \text{[Formula 31]}$$

Thus, the difference ST (m, n) between the target isolated width Soe2T of the second birefringent element 5 and Soe2 (m, n) (isolated width difference from the first birefringent element 4) is expressed by the following formula.

$$ST(m,n) = Soe2T - Soe2(m,n) \quad \text{[Formula 32]}$$

(See Formula 32.)

Further, an angle θed1n between the extraordinary ray wave normal direction and the aforementioned element surface normal direction is expressed by the following formula.

$$\theta ed1n = \theta rn - \theta n \quad \text{[Formula 33]}$$

Hence, an optical path length difference d2 (m, n) between the ordinary ray and extraordinary ray produced by the second birefringent element 5 is expressed by the following formula.

$$d2(m, n) = tm \cdot \left( \frac{nne1n}{\cos\left(\theta ed1n \cdot \frac{\pi}{180}\right)} - \frac{no}{\cos\left(\theta o \cdot \frac{\pi}{180}\right)} \right).$$ [Formula 34]

$$\cos\left(\alpha \cdot \frac{\pi}{180} - \theta ed1n \cdot \frac{\pi}{180}\right)$$

Further, the polarization mode dispersion PMD2 (m, n) produced by this optical path length difference d2 (m, n) is expressed by the following formula.

$$PMD2(m, n) = \frac{d2(m, n)}{v} \cdot 10^6$$ [Formula 35]

Hence, the polarization mode dispersion difference PMD0 (m, n) between the polarization mode dispersion PMD1 produced at the first birefringent element 4 and the polarization mode dispersion PMD2 (m, n) produced at the second birefringent element 5 is expressed by the following formula.

$$PMD0(m,n) = PMD1 - PMD2(m,n)$$ [Formula 36]

(See Formula 36.)

Formula 32 and Formula 36 are used, and an isolated width difference ST (m, n) and a polarization mode dispersion difference PMD0(m,n) when the element surface normal direction thickness tm of the second birefringent element 5 is varied are determined. Some of the results are listed in table 1. In this calculation, the angle of the crystal axis $\theta n$ with respect to the element surface normal direction of the second birefringent element 5 is fixed to 59 degrees.

TABLE 1

| tm (μm) | ST (m, n) (μm) | PMD0 (m, n) (ps) |
|---|---|---|
| 145 | 1.084 | $2.317 \cdot 10^{-3}$ |
| 146 | 0.993 | $1.688 \cdot 10^{-3}$ |
| 147 | 0.903 | $1.059 \cdot 10^{-3}$ |
| 148 | 0.812 | $4.301 \cdot 10^{-4}$ |
| 149 | 0.721 | $-1.988 \cdot 10^{-4}$ |
| 150 | 0.631 | $-8.277 \cdot 10^{-4}$ |
| 151 | 0.54 | $-1.457 \cdot 10^{-3}$ |
| 152 | 0.45 | $-2.085 \cdot 10^{-3}$ |
| 153 | 0.359 | $-2.714 \cdot 10^{-3}$ |
| 154 | 0.268 | $-3.343 \cdot 10^{-3}$ |
| 155 | 0.178 | $-3.972 \cdot 10^{-3}$ |
| 156 | 0.087 | $-4.601 \cdot 10^{-3}$ |
| 157 | $-3.623 \cdot 10^{-3}$ | $-5.23 \cdot 10^{-3}$ |
| 158 | -0.094 | $-5.859 \cdot 10^{-3}$ |
| 159 | -0.185 | $-6.487 \cdot 10^{-3}$ |
| 160 | -0.276 | $-7.116 \cdot 10^{-3}$ |

Each crystal axis X12, X22, X32 direction of the respective birefringent elements 4 and 5, each element surface normal direction thickness t1, tm, and a combination thereof can be variously considered, so that more than one pattern can be thought. However, when the priority is given to the reduction in isolated width difference ST(m, n), it is desirable that the crystal axis X12 and X22 orientations at 47.8 degrees as described above, and it is also desirable that, as seen from Table 1, θn (crystal axis X32 orientation) is set at 59 degrees and the element surface normal direction thickness tm is set as 157 μm. By employing the combination of θn=59 degrees and the element surface normal direction thickness tm=157 μm, the isolated width difference ST(m, n) and the polarization mode dispersion difference PMD0(m, n) to be reduced their minimum values, about 0.004 μm and about 0.006 ps, respectively. Furthermore, the magnitude of the values of the isolated width difference ST(m, n) and the polarization mode dispersion difference PMD0(m, n) is determined according to their absolute values.

For the optical isolator 1 having the going-returning paths, since the light is transmitted through the first and second birefringent elements 4 and 5 twice along the going-returning paths, the isolated width difference ST(m, n) is at worst about 0.008 μm and polarization mode dispersion difference PMD0 (m, n) is at worst about 0.012 ps. However, by setting the aforementioned θn at 59 degrees and element surface normal direction thickness tm at 157 μ, the second birefringent element 5 can be provided which can reduce the isolated width difference Soe1 and polarization mode dispersion difference PMD1 between the ordinary ray and extraordinary ray that are produced in the first birefringent element 4 to the range within practically desirable numeral value levels (i.e., the isolated width difference ST(m, n)<0.5 μm and the polarization mode dispersion difference PMD0(m, n)<0.05 ps). Thus, the PMD and PDL between the light 11 and 12 produced in the first birefringent plate 4a is reduced to desired numeral levels by transmitting the light 11 and 12 through the second birefringent plate 5 before they are transmitted in the lens 7.

Similarly, for the light completely reflected by the total reflection film 8, the PMD and PDL between the light 11 and light 12 are reduced to desired numeral levels before being transmitted in the optical fiber 3, by transmitting the light 11 and light 12 through the second birefringent element 5 and the second birefringent plate 4b. This indicates that the PMD and PDL produced in the going path is reduced in the going path, while the PMD and PDL produced in the returning path is reduced in the returning path. For the optical isolators having going-returning optical paths using reflection, light is transmitted through the same optical element twice, so that the PMD and PDL which are produced in the single optical element are doubled and affect the light outgoing from the optical isolator. However, for the optical isolator 1, the PMD and PDL which are produced in the going optical path are reduced before the light is reflected by the total reflection film 8, so that severe affection by the PMD and PDL to the returning optical path can be prevented. Further, the PMD and PDL which are produced in the returning optical path are also reduced by transmitting the light through the second birefringent element 5, which is subjected to correction of the crystal axis orientation and correction of the thickness in the direction of the normal to the element, and through the second birefringent plate 4b. Accordingly, when the light outgoing from the optical fiber 2 is launched in the optical fiber 3, the PMD and PDL of the transmitted light have been reduced to desired numeral levels.

The optical isolator 1 according to the present invention is constituted only by optical elements indispensable for providing the optical isolator function, so that the optical path design is simplified and the structure of the optical isolator 1 can be simplified and reduced in size and cost. Furthermore, since the second birefringent element 5 which is an indispensable optical element for providing the optical isolator function is imparted with the PDL and PMD reduction function, it is also possible to further enhance the property of the optical isolator 1.

In the foregoing description, the θn and the element surface normal direction thickness tm of the second birefringent element 5 are calculated giving a priority so as to minimize the isolated width difference ST(m, n) of the optical isolator 1. However, there is another solution when a priority is given so as to minimize the PMD0(m, n) after transmission through the first and second birefringent elements 4 and 5, while the isolated width difference ST(m, n) affects directly oh the PDL effect of the optical isolator, it can be reduced by increasing the beam diameter of the propagating light. When speed communications 40 G bps or more are achieved in the optical communication environment in future, the PMD will pose a problem. In such a case, the problem can be solved by providing a solution wherein a priority is given to minimization of the PMD0(m, n). Specifically, it is desirable that the crystal axis angle θ1 (crystal axis X12, X22 orientations) with respect to the element surface normal direction of the first birefringent element 4 is set at 47.8 degrees; the crystal axis angle θn (crystal axis X32 orientation) with respect to the element surface normal direction of the second birefringent element 5 is set at 59 degrees, and the element surface normal direction thickness tm is set at 152 μm such that PMD0(m, n) is minimized with the isolated width reference ST(m, n)<0.5 μm.

As described above, when imparting the second birefringent element 5 with the PDL and PMD reduction functions, the choice of whether to give priority to reduction in PDL or PMD can be accommodated simply by changing the numeral values of the crystal axis angle θn and element surface normal direction thickness tm of the second birefringent element 5. Thus, the aforementioned preference can be easily changed depending on the application and required feature of the respective optical isolators, so that availabilities of the optical isolators can be expanded.

In the forward direction, the light 11 and light 12 along the two optical paths are transmitted through the two birefringent elements 4 and 5 before being transmitted into the lens 7. Further, if the element surface normal direction thickness tm of the second birefringent element 5 is set at 157 μm, the isolated width differences ST(m, n) of the light 11 and the light 12 are minimized when the light 11 and light 12 emerge from the second birefringent element (at a time of FIG. 2D). Since the isolated width difference ST(m, n) which directly affects on the PDL effect of the optical isolator 1 is minimized, it becomes possible to cause the light 11 and light 12 to be completely reflected substantially at the same point on the total reflection film 8.

Furthermore, the crystal axis X11 orientation and the crystal axis X31 orientation, and the element surface normal direction thicknesses ti and tm (=t2) are set such that the center 11c and the center 12c are positioned equi-distance from the single point f1 on the total reflection film 8 (i.e., the distance between the center 11c and the point f1 and the distance between the center 12c and the point f1 are equal to each other). As a result, the optical path lengths of the light 11 and the light 12 to the single point f1 within the lens 7 become equal to each other. Thus, the difference in optical path length between the optical paths of the light 11 and light 12 within the lens 7 associated with the total reflection by the total reflection film 8 can be substantially eliminated.

In this way, the PDL produced between the light 11 and the light 12 in the going-returning optical paths within the lens 7 can be reduced to a desired numeral level: by minimizing the isolated width distance ST(m,n) by changing the numeral values of the crystal axis angle θn and element surface normal direction thickness tm of the second birefringent element 5; and by positioning the centers 11c and 12c of the respective polarization planes at equi-distance from the single point f1 by setting the crystal axis X11 orientation, crystal axis X31 orientation, and element surface normal direction thickness t1 and tm(=t2). By using a GRIN lens as the lens 7 and integrally forming as the total reflection member a total reflection film 8 on the end face of the lens, the going-returning optical paths based on point-symmetric reflection can be designed easily, and the dimension in the optical-path direction (Z-axis direction) of the optical isolator 1 can be made shorter.

Further, as described above, by forming the light inlet/outlet end of the optical fiber 2, 3 to be inclined, the reflection return light from the light inlet/outlet surface of the optical device to the optical fiber 2, 3 can be prevented even if the optical device of the optical isolator is not disposed in an inclined manner with respect to a light propagating optical path or even if the aforementioned optical device is formed in a wedge shape.

In addition, the element surface normal direction thickness t1 of the first birefringent element 4 must be set at a value so as to exceed at least 105 μm. The reason is that when the light incident from the optical fiber 2 is split to an ordinary ray and an extraordinary ray by the first birefringent plate 4a, the isolated width Soe1 is one-tenth the element surface normal direction thickness t1 of the first birefringent plate 4a, and the mode field diameter (MFD) of the optical fiber 2 should be taken into account for completely splitting or isolating the light incident upon the first birefringent plate 4a into an ordinary ray and an extraordinary ray. In the case of a single mode optical fiber, its core diameter is about 10.5 μm. This numeral value of 10.5 μm is belongs to the smallest fiber diameter group among various optical fibers. Therefore, in consideration of completely splitting incident light from all kinds of optical fibers into an ordinary ray and an extraordinary ray, the value of the element surface normal direction thickness t1 should exceed 105 μm.

Figure 7:
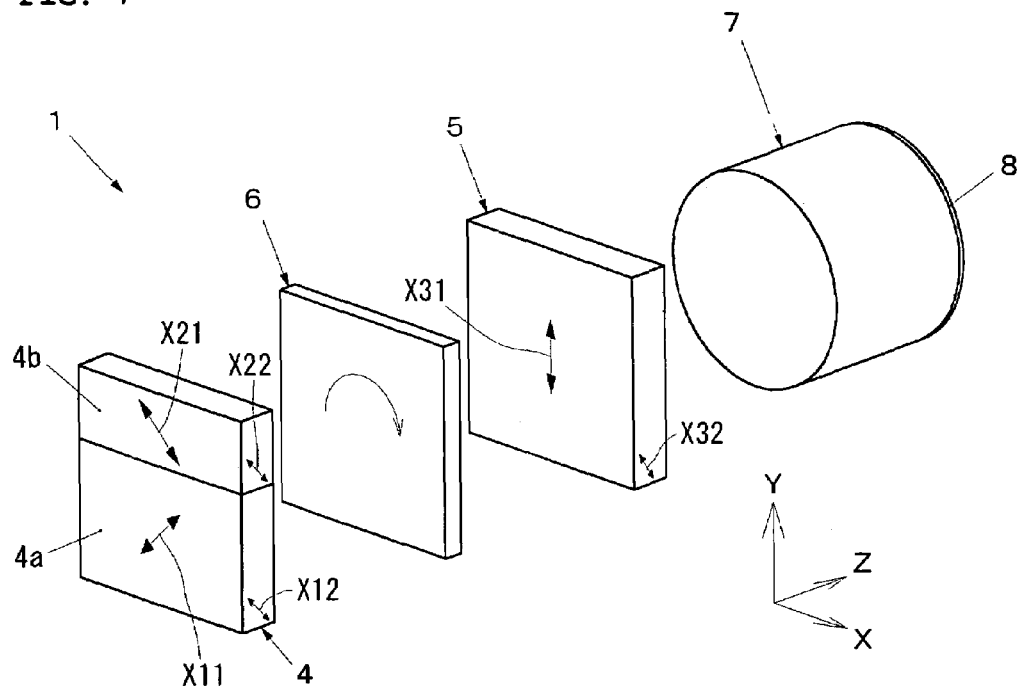
FIG. 7 is a schematic perspective view showing a modification of the optical isolator in FIG. 1.

Furthermore, it is of course that modifications based on the technical concept of invention are applicable to the optical isolator 1 and the optical device incorporating the optical isolator 1. For example, each of the crystal axis X11, X12, X21, X22, X31, X32 directions and element surface normal direction thickness t1, t2 (=tm) of the first and second birefringent element 4, 5 may be variously modified depending on a required property, and not limited to a single pattern illustrated in FIGS. 1 to 4. For example, as a modification of the crystal axis X11 orientation and the crystal axis X12 orientation, it is possible that, as shown in FIG. 7, supposing the horizontal direction is 0 degree, the crystal axis X11 orientation is set to be inclined at a 45 degree angle from the 0 degree while the crystal axis X21 orientation is set to be different 90 degrees with respect to the crystal axis X11 orientation. In the case shown in FIG. 7, to provide an isolator function, it is required to change the rotation direction of the Faraday rotator 6 to the clockwise direction for changing of the crystal axis X11 and X21 orientations of the first birefringent element 4.

Further, the optical fiber 2, 3 may be changed to an expanded core optical fiber. By using the expanded core optical fiber, a loss caused by misalignment between the optical fibers 2 and 3 can be suppressed, whereby when the optical fibers 2 and 3 are positioned with respect to the optical isolator 1, the tolerance in the horizontal direction (X-axis direction) and vertical direction (Y-axis direction) can be reduced.

Furthermore, by using an optical fiber 2, 3 whose allowable bending radius of the optical fiber is set at 15 mm or less, the bending loss of the optical fiber can be reduced. Thus, the optical fiber 2, 3 can be set in a compact winding condition, whereby the area required for routing the optical fiber within the amplifier can be reduced, which contributes to reduction in size of the amplifier. Further, while Embodiment 1 is described taking as an example the case where GRIN lens is used as the lens 7, however, an aspherical lens may be substituted for the GRIN lens.

Second Embodiment

Figure 8:
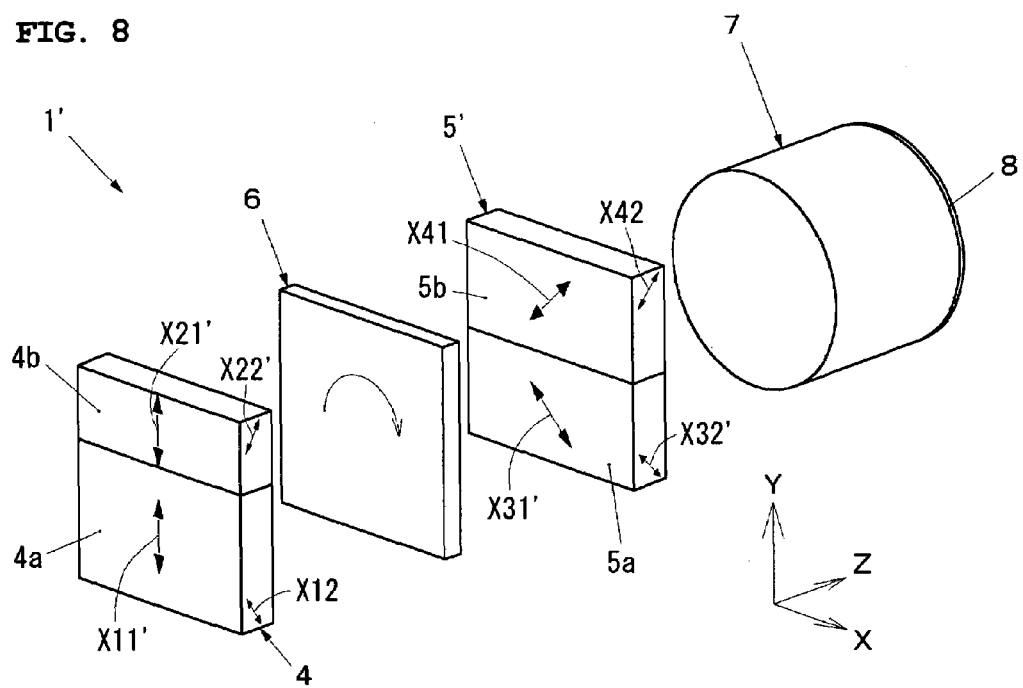
FIG. 8 is a schematic perspective view showing an optical isolator according to a second embodiment of the invention.
Figure 9:
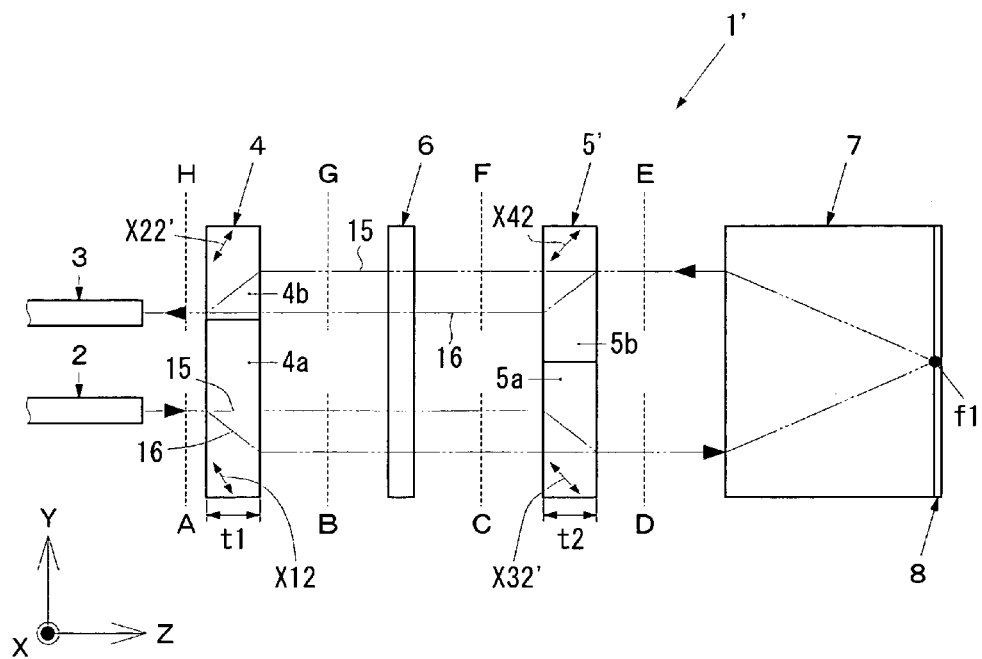
FIG. 9 is a side view of an optical device comprising the optical isolator in FIG. 8 and a plurality of optical fibers optically coupled to the optical isolator, showing optical paths when light propagates in the forward direction.
Figure 10:
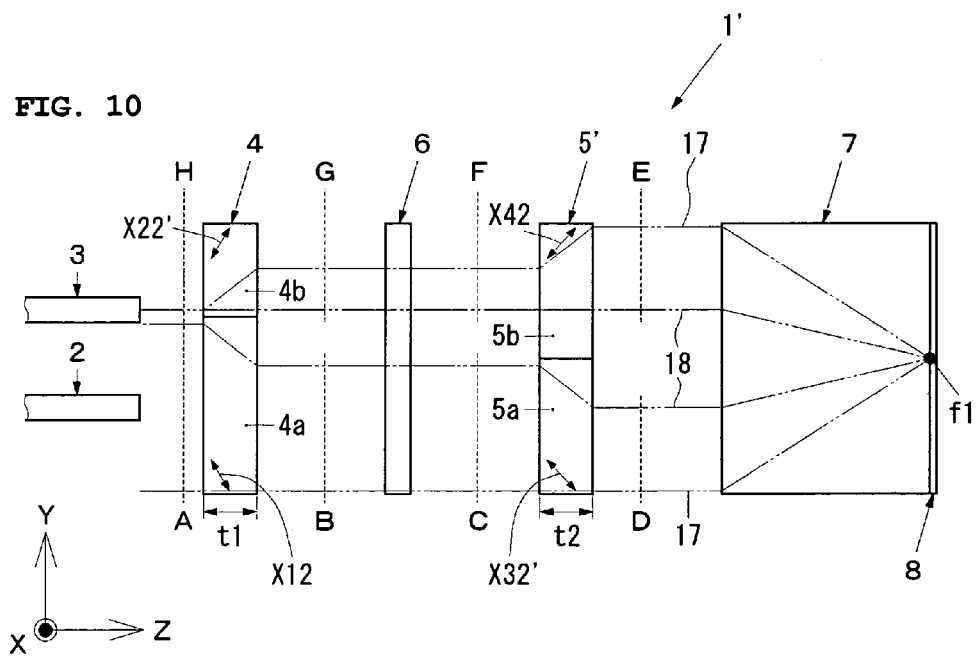
FIG. 10 is a side view of the optical device, showing optical paths when light propagates in the reverse direction.

A second embodiment of the present invention will be described in detail below with reference to FIG. 8 to FIG. 10. FIG. 8 is a schematic perspective view showing an optical isolator according to a second embodiment of the invention; FIG. 9 is a side view of an optical device comprising the optical isolator in FIG. 8 and a plurality of optical fibers optically coupled to the optical isolator, showing optical paths when light propagates in the forward direction; and FIG. 10 is a side view of the optical device, showing optical paths when light propagates in the reverse direction. Note that similar parts to those of the optical isolator 1 and the optical device described in the description of first embodiment are assigned the similar number, and descriptions thereof are omitted or simplified.

As shown in FIG. 8 to FIG. 10, an optical isolator 1' is constituted by a first birefringent element 4 (rutile type crystal), a second birefringent element 5 (rutile type crystal), a Faraday rotator 6, a magnet (not shown) for magnetically saturating the Faraday rotator 6, a lens 7, and a total reflection member 8.

As shown in FIG. 8, the first birefringent element 4 is made up of two birefringent plates (a first birefringent plate 4a and a second birefringent plate 4b), which are arranged such that the directions of the respective crystal axes X11' and X21' are different by 180 degrees to each other when viewed from the light incident side in the forward direction (i.e., viewed from the light outgoing direction from the optical fiber 2). Supposing the horizontal direction parallel to the X-axis is 0 degree, the crystal axis X11' orientation of the first birefringent plate 4a as viewed from the light incident side is set to be inclined at a 90 degree angle from the 0 degree. Accordingly, the crystal axis X21' orientation of the second birefringent plate 4b is set to be inclined at a 90 degree angle from the 0 degree such that the crystal axis X21' direction is different by 180 degrees from the 90 degrees.

The rotation direction of the incident light polarization plane of the Faraday rotator 6 is set to be the clockwise direction when viewed along Z-axis from the incident side of the light which is transmitted through the Faraday rotator 6 and propagated to the second birefringent element 5', i.e. the optical fiber 2 side.

In FIG. 1, the second birefringent element 5', which is disposed on the side of the Faraday rotator 6 opposite the first birefringent plate 4a, is made up, as shown in FIG. 8, of two birefringent plates (a third birefringent plate 5a and a fourth birefringent plate 5b), which are arranged such that the directions of the respective crystal axes X31' and X41' are different by 90 degrees to each other when viewed from the light incident side in the forward direction (i.e., viewed from the light outgoing direction from the optical fiber 2). Supposing the horizontal direction parallel to the X-axis is 0 degree, the crystal axis X31' orientation of the third birefringent plate 5a when viewed from the light incident side is set to be inclined at a 135 degree angle from the 0 degree. Accordingly, the crystal axis 41 orientation of the fourth birefringent plate 5b is set to be inclined at a 45 degree angle from the 0 degree such that the crystal axis 41 orientation is different by 90 degrees from the 135 degrees.

Further, the crystal axis X31' and 41' orientations when viewed from the light incident side is set to be different by 45 degrees to the aforementioned crystal axis X11' and X21' orientations.

When the first birefringent plate 4a, the second birefringent plate 4b, the third birefringent plate 5a, the fourth birefringent plate 5b are fixed by adhesion to each other, the boundary thereof should be disposed between the optical fibers 2 and 3. Further, the aforementioned boundary should be positioned in consideration of the dispersion of light launched in and outgoing from the optical fibers 2 and 3 such that the light outgoing from the optical fiber 2 is transmitted through the first and third birefringent plates 4a and 5a only and the light launched in or outgoing from the optical fiber 3 is transmitted through the second and fourth birefringent plates 4b and 5b only.

Figure 11:
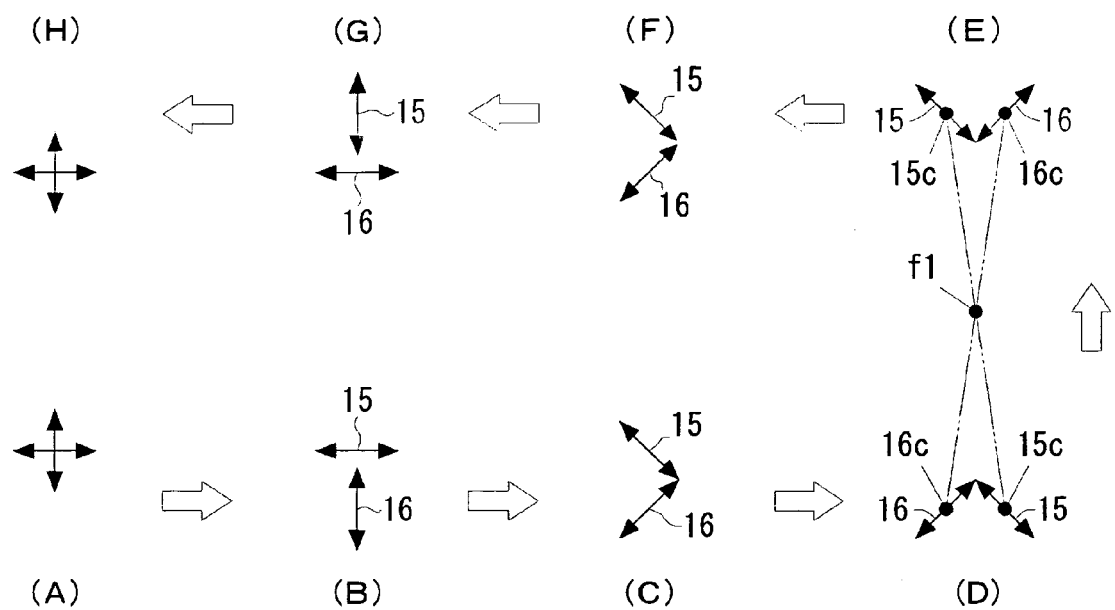
FIG. 11 shows views illustrating polarization states of the light propagating in the forward direction in the optical isolator in FIG. 8.
Figure 12:
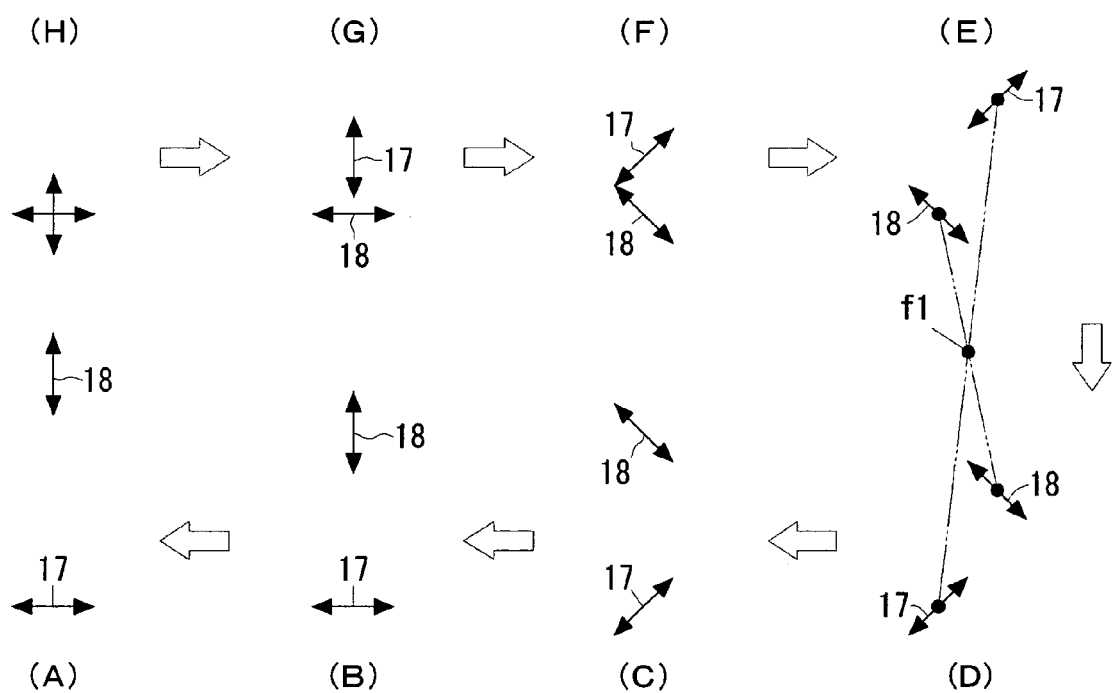
FIG. 12 shows views illustrating polarization states of the light propagating in the reverse direction in the optical isolator in FIG. 8.
Figure 13:
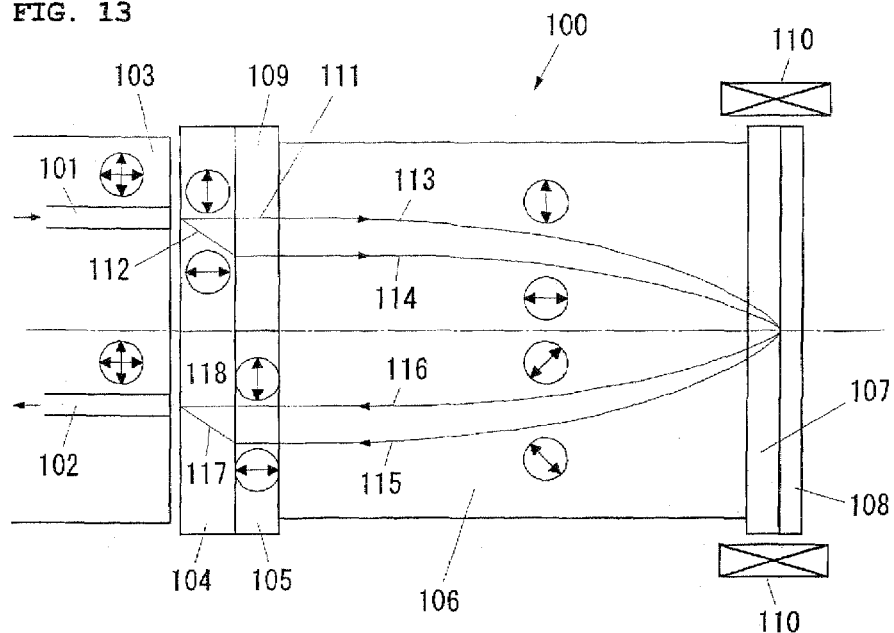
FIG. 13 is a side view for illustrating the polarization states and change of optical paths when light propagating in the forward direction is transmitted through a conventional in-line optical isolator.
Figure 14:
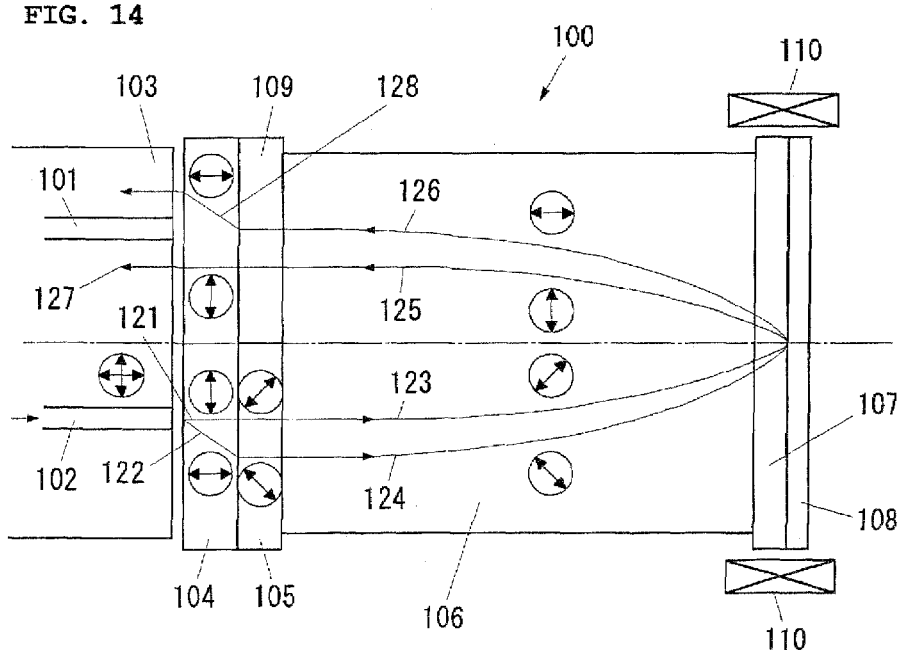
FIG. 14 is a view for illustrating the polarization states and change in optical paths when light propagating in the reverse direction is transmitted through the optical isolator in FIG. 13.
Figure 15:
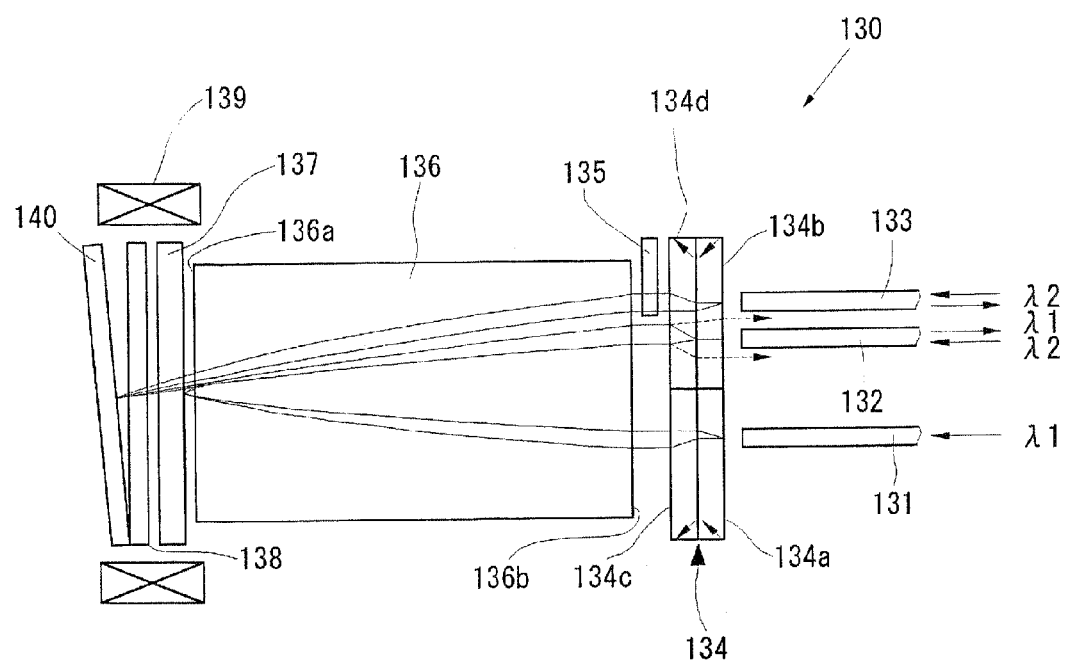
FIG. 15 is a side view for illustrating the operation of a conventional composite module of optical elements having an optical isolator function in which a plurality of birefringent elements are placed upstream from a lens.

Operations of the optical isolator 1' and the optical device will be described in the following. FIG. 11 shows views illustrating polarization states of the light propagating in the forward direction in the optical isolator 1', and FIG. 12 shows views illustrating polarization states of the light propagating in the reverse direction in the optical isolator 1'. In FIG. 11, (A) to (H) respectively represent polarization planes of the light which are shown in section taken along the broken lines A to H in FIG. 9. In FIG. 12, (A) to (H) respectively represent polarization planes of the light which are shown in section taken along the broken lines A to H in FIG. 10. Here, each polarization state of the light represents the polarization plane of the propagating light as viewed from the side of the optical fibers 2 and 3 along the Z-axis. Further, as used herein, the clockwise rotation of the polarization plane is referred to as right-handed rotation, and the counterclockwise thereof is referred to as left-handed rotation. The behavior of the light within the lens 7 is that schematically drawn at the center of the propagating light.

Also in the particular embodiment, the optical path from outgoing of the light from the optical fiber 2 or 3 to complete reflection by the total reflection film 8 is referred to as a "going path", while the optical path from the complete reflection of by the total reflection film 8 to incoming of the light to the optical fiber 2 or 3 is referred to as a "returning path", and these optical paths are referred to hereinafter collectively as a "going-returning optical paths". Furthermore, as used herein, a series of optical paths from outgoing from the optical fiber 2 to incoming in the optical fiber 3 is referred to as a "forward optical path", while a series of optical paths from outgoing from the optical fiber 3 to incoming in the optical fiber 2 is referred to as a "reverse optical path".

First, the forward optical path will be described. To begin with, unpolarized light (FIG. 11(A)) is launched from the optical fiber 2 to the first birefringent plate 4a. Among the polarization planes of the light, light 16 which is a polarization plane parallel to the crystal axis X11' becomes an extraordinary ray. The optical path of the light 16 is shifted diagonally downward as shown in FIG. 9 (FIG. 11(B)). On the other hand, the polarization plane of light 15 is not parallel to the crystal axis X11', so that it is not shifted and travels straight ahead as an ordinary ray. Thus, the unpolarized light is split into the light 15 and the light 16 by the first birefringent plate 4a and the light 11 and the light 12 propagate optical paths different to each other. The rotation direction of the Faraday rotator 6 is set right-handed rotation as described above, each of the polarization planes of the light 15 and the light 16 launched in the Faraday rotator 6 is rotated about 45 degrees in the clockwise direction (FIG. 11(C)).

Then, the light 15 and the light 16 are launched in the third birefringent plate 5a. As described above, the crystal axis X31' orientation is set to be different 45 degrees with respect to the crystal axis X11' orientation. This relative angle difference of 45 degrees is the same value as that of the rotation angle of the Faraday rotator 6. Thus, the polarization plane of the light 15 rotated in the clockwise direction by the Faraday rotator 6 becomes parallel to the crystal axis X31' orientation. Therefore, when the light 15 and the light 16 having the polarization plane shown in FIG. 11(C) enter the third birefringent plate 5a, the light 15 which is transmitted through the first birefringent plate 4a as an ordinary ray now becomes an extraordinary ray, so that the light 15 is shifted diagonally downward as shown in FIG. 9 (see FIG. 11(D)). On the other hand, the polarization plane of the light 16 which is transmitted through the first birefringent plate 4a as an extraordinary ray, is not parallel to the crystal axis X31' so that it is not shifted and travels straight ahead as an ordinary ray.

As described above, the crystal axis X11' orientation and the crystal axis X31' orientation, and the element surface normal direction thickness t1 of the first birefringent element 4 and the element surface normal direction thickness t2 of the second birefringent element 5' are set such that when the light 15 and the light 16 are transmitted through the first birefringent plate 4a and third birefringent plate 5a, they necessarily provide both polarization states of the ordinary ray and the extraordinary ray, respectively. Furthermore, in the forward direction, by setting the crystal axis X11' orientation and the crystal axis X31' orientation in consideration of shifting the extraordinary ray diagonally downward as shown in FIG. 9, it becomes possible to set the first birefringent plate 4a and the third birefringent plate 5a such that the centers 15c and 16c of the polarization planes of the light 15 and light 16 after transmission are positioned at equi-distances from a single point f1 on the total reflection film 8 (i.e. the condition where the distance between the center 15c and the point f1 is equal to the distance between the center 16c and the point f1). The light 15 and the light 16 which are transmitted through the third birefringent plate 5a are then launched in the lens 7.

The light 15 and the light 16 which enter inside the lens 7 are gradually converged to the single point f1 on the surface of the total reflection film 8 and matched at the single point f1 and completely reflected point-symmetrically. As described above, the crystal axis X11' orientation and the crystal axis X31' orientation, and the element surface normal direction thickness t1 of the first birefringent element 4 and the element surface normal direction thickness t2 of the second birefringent element 5' are set such that the distance between the center 15c and the point f1 becomes equal to the distance between the center 16c and the point f1, so that the distance between the center 15c and the point f1 and the distance between the center 16c and the point f1 after total reflection become equal to each other. The light 15 and the light 16 completely reflected and outgoing from the lens 7 (see FIG. 11(E)) are re-transmitted in the fourth birefringent plate 5b. Different from the optical going path, in the fourth birefringent plate 5b, the polarization plane of the light 16 becomes parallel to the crystal axis 41 orientation, so that the light 16 becomes an extraordinary ray and is shifted diagonally downward as shown in FIG. 2 (see FIG. 11(F)). On the other hand, since the polarization plane of the light 15 is not parallel to the crystal axis X41 orientation, it is not shifted and travels straight ahead as an ordinary ray.

Then, the respective polarization planes of the light 15 and light 16 which are launched in the Faraday rotator 6 are rotated about 45 degrees in the clockwise direction (FIG. 11(G)). The light 15 and the light 16 are transmitted through the Faraday rotator 6 twice when propagating along the going-returning paths, so that each polarization plane is totally rotated 90 degrees in the clockwise direction compared with the polarization states (FIG. 11(B)) when outgoing from the first birefringent plate 4a. The light 15 and the light 16 with these polarization states are launched in the second birefringent plate 4b of the first birefringent element 4.

As described above, the crystal axis X21' orientation of the second birefringent plate 4b is set to be different 180 degrees with respect to the crystal axis X11' orientation of the first birefringent plate 4a, and the polarization planes of the light 15 and the light 16 transmitted through the Faraday rotator 6 when propagating along the optical returning path are each totally rotated 90 degrees in the clockwise direction compared with the polarization state (FIG. 11(B)) when outgoing from the first birefringent plate 4a. Therefore, the light 15 which was the ordinary ray when transmitted through the first birefringent plate 4a becomes an extraordinary ray in the optical returning path, so that, as shown in FIG. 9, the light launched in the second birefringent plate 4b is shifted diagonally downward (see FIG. 11(H)). On the other hand, the light 16 is an ordinary ray within the second birefringent plate 4b, so that it travels straight ahead through the second birefringent plate 4b. In this way, the light 15 which was transmitted through the fourth birefringent plate 5b as an ordinary ray after completely reflected by the total reflection film 8 is transmitted as an extraordinary ray, while the light 16 which was transmitted through the fourth birefringent plate 5b as an extraordinary ray after completely reflected by the total reflection film 8 is transmitted as an ordinary ray. The optical paths of the light 15 and the light 16 are matched when transmitted through the second birefringent plate 4b by the fact that they are shifted. As a result, the light is optically coupled to the optical fiber 3 with the original incident light state, i.e. the state that the ordinary ray and the extraordinary ray are matched.

The optical path in the reverse direction will now be described. When unpolarized light outgoing from the optical fiber 3 is launched (FIG. 12(H)), the light which enters the second birefringent plate 4b is split into light 18 that is an ordinary ray and light 17 that is an extraordinary ray, and the light 17 is shifted diagonally upward as shown in FIG. 10 (see FIG. 12(G)), so that the light 17 and the light 18 propagate along optical paths which are different to each other. Further, when transmitted through the Faraday rotator 6, each polarization plane is rotated about 45 degrees in the clockwise direction (see FIG. 12(F)), and then the light 17 and the light 18 are launched in the fourth birefringent plate 5b. In the fourth birefringent plate 5b, the polarization plane of the light 17 becomes parallel to the crystal axis 41 orientation, so that the light 17 becomes an extraordinary ray and is shifted diagonally upward as shown in FIG. 10 (see FIG. 12(E)).

Then, the light 17 and the light 18 are transmitted in the lens 7 wherein they are gradually converged to the single point f1 on the surface of the total reflection film 8 and matched at the single point f1 and completely reflected point-symmetrically. Then, the light 17 and the light 18 from the lens 7 are transmitted in the third birefringent plate 5a (see FIG. 12(D)). The light 18 which enters the third birefringent plate 5a propagates therethrough as an extraordinary ray, so that it is shifted diagonally upward as shown in FIG. 10 (see FIG. 12(C)), and re-launched in the Faraday rotator 6.

Then, the respective polarization planes of the light 17 and light 18, which are transmitted in the Faraday rotator 6 are rotated about 45 degrees in the clockwise direction (FIG. 12(B)). Thus, the respective polarization planes (FIG. 6(B)) of the light 17 and light 18 which are re-emerged from the Faraday rotator 6, provide polarized states wherein the polarization planes are rotated 90 degrees in the clockwise direction compared with the states (FIG. 12(G)) when outgoing from the second birefringent plate 4b. The light 17 and the light 18 with these polarization states are transmitted in the first birefringent plate 4a of the first birefringent element 4.

As described above, the crystal axis X11' orientation of the first birefringent plate 4a is set to be different by 180 degrees with respect to the crystal axis X21' orientation of the second birefringent plate 4b, and polarization planes of the light 17 and the light 18 transmitted through the Faraday rotator 6 when propagating along the optical returning path are each totally rotated 90 degrees in the counterclockwise and clockwise directions compared with the polarization state (FIG. 12(G)) when outgoing from the second birefringent plate 4b. Therefore, the light 18 which was the ordinary ray when transmitted through the second birefringent plate 4b becomes an extraordinary ray in the optical returning path, so that, as shown in FIG. 10, the light is shifted diagonally upward (see FIG. 12(A)). On the other hand, the light 17 is an ordinary ray within the first birefringent plate 4a, so that it travels straight ahead through the first birefringent plate 4a. In this way, the optical paths of the light 17 and the light 18 are offset from each other and not matched and both of them do not enter the optical fiber 2.

As described above, the optical isolator 1' can obtain an optical isolator function wherein the light transmitted from the optical fiber 2 is optically coupled to the optical fiber 3 while the light transmitted from the optical fiber 3 is not optically coupled to the optical fiber 2. In order to ensure this optical isolator function, the first and second birefringent elements 4 and 5' must be reciprocal elements. In addition, the Faraday rotator 6 must be a nonreciprocal element.

For reducing the PMD and PDL of the light 15 and light 16 based on the difference in each refractive index of the first and third birefringent plates 4a, 5a and the second and fourth birefringent plates 4b, 5b, what is necessary is to obtain a solution that gives a priority to minimization of the aforementioned isolated width difference ST(m, n) or the aforementioned PMD0(m, n) by using Formula 32 and Formula 36. Furthermore, to determine the solution, practically desired numeral values (the isolated width difference ST (m, n)<0.5 μm, the polarization mode dispersion difference PMD0(m, n)<0.05 ps) should be satisfied.

In association with the changing from the crystal axis X12 and X21 orientations to the crystal axis X11' and X21' orientations and changing from the crystal axis X31 orientation to the crystal axis X31' and 41' orientations, Formula 1 to Formula 14 and the technical concept thereof are applied to the second birefringent element 5' and Formula 15 to Formula 36 and the technical concept thereof are applied to the first birefringent element 4. What is necessary is first determining the element surface normal direction thickness t2 (200 μm) and respective crystal axis X32' and X42 orientations (47.8 degrees) of the third and fourth birefringent plates 5a, 5b, and then obtaining optimum solution for the crystal axis X12 and X22' orientations and the aforementioned element surface normal direction thickness t1 by correction.

Furthermore, as described above, the crystal axis X11' orientation and the crystal axis X31' orientation, and the element surface normal direction thicknesses t1 and tm (=t2) are set such that the centers 15c and 16C of the respective polarization planes of the light 15 and light 16 after transmitted through the first birefringent plate 4a and third birefringent plate 5a are positioned at equi-distance from a single point f1 on the total reflection film (i.e., the distance between the center 15c and the point f1 and the distance between the center 16c and the point f1 are equal to each other). As a result, the optical path lengths of the light 15 and the light 16 to the single point f1 within the lens 7 become equal to each other. Thus, the difference in optical path length between the optical paths of the light 15 and light 16 within the lens 7 associated with the total reflection by the total reflection film 8 can be substantially eliminated.

In this way, the PDL produced between the light 15 and the light 16 in the going-returning optical paths within the lens 7 can be reduced to a desired numeral level: by minimizing the isolated width distance ST(m,n) by changing the crystal axis X12, x22' orientations and the numeral values of the element surface normal direction thickness t1 of the first birefringent element 4; and by positioning the centers 15c and 16c of the respective polarization planes at equi-distance from the single point f1 by setting the crystal axis X11' orientation, crystal axis X31' orientation, and element surface normal direction thickness t1 and tm(=t2).

It is of course that the optical isolator 1' and the optical device incorporating the optical isolator 1' are provided with the functionality and operations similar to those of the optical isolator 1 and the optical device incorporating the optical isolator 1, so that the description thereof is omitted. Further, it is also of course that modifications based on the technical concept of the first embodiment are applicable to the optical isolator 1' and the optical device incorporating the optical isolator 1'.

INDUSTRIAL APPLICABILITY

By using the optical isolator of the invention in the amplifiers, reflection return light to the semiconductor laser light source can be prevented.

What is claimed is:

1. An optical isolator comprising:
   a first birefringent element to which unpolarized light is transmitted and a second birefringent element to which light split into an ordinary ray and an extraordinary ray is transmitted;
   a Faraday rotator which is disposed between the first and second birefringent elements and has a rotation angle of 45 degrees when magnetically saturated;
   a magnet for magnetically saturating the Faraday rotator;
   a lens for converging the ordinary ray and the extraordinary ray outgoing from the second birefringent element; and
   a total reflection member for completely reflecting point-symmetrically the ordinary ray and the extraordinary ray by way of conversion of the lens,
   wherein the first birefringent element is constituted by a first birefringent plate and a second birefringent plate, crystal axis orientations of the first and second birefringent plates being different by 90 degrees from each other when viewed from the light incident side;
   supposing that a horizontal direction is 0 degree, the crystal axis orientations of the first birefringent plate when viewed from the light incident side in a forward direction is set at 45 degrees or 135 degrees;
   a rotation direction of the Faraday rotator when viewed from an incident side of light which is transmitted through the Faraday rotator and propagated to the second birefringent element is set to: a clockwise direction when the crystal axis orientation of the first birefringent plate is 45 degrees; and a counterclockwise direction when the crystal axis orientation of the first birefringent plate is 135 degrees;
   a crystal axis direction of the second birefringent element when viewed from the light incident side is set different by 45 degrees to the first crystal axis orientation;
   the unpolarized light transmitted in the first birefringent plate is split to an ordinary ray and an extraordinary ray, the ordinary ray and the extraordinary ray are transmitted in the Faraday rotator wherein polarization planes thereof are rotated 45 degrees; when the split light is transmitted through the second birefringent element, the light transmitted through the first birefringent plate as the ordinary ray is transmitted therethrough as an extraordinary ray while the light transmitted through the first birefringent plate as the extraordinary ray is transmitted therethrough as an ordinary ray; and the resulting ordinary ray and extraordinary ray are transmitted in the lens and completely reflected point-symmetrically by the total reflection member at a single point;

the ordinary ray and the extraordinary ray which are completely reflected by the total reflection member are re-transmitted in the second birefringent element and the Faraday rotator in this order; when the ordinary ray and the extraordinary ray are finally transmitted through the second birefringent plate, the light transmitted through the second birefringent element as the ordinary ray after total reflection is transmitted therethrough as an extraordinary ray, while the light transmitted through the second birefringent element as the extraordinary ray after total reflection is transmitted therethrough as an ordinary ray; further the optical isolator has going-returning paths wherein the optical paths of an ordinary ray and an extraordinary ray are matched when the ordinary ray and the extraordinary ray are transmitted through the second birefiringent plate;

the optical path length from a center of polarization plane of the ordinary ray transmitted in the lens from the second birefringent element to the single point on the total reflection member and the optical path length from a center of polarization plane of the extraordinary ray launched in the lens from the second birefringent element to the single point on the total reflection member is set equal; and the first birefringent the second birefringent element has a crystal axis orientation with respect to an element surface normal direction and an element surface normal direction thickness which are necessary for setting an isolated width difference and a polarization mode dispersion between the ordinary ray and the extraordinary ray produced in the first birefringent element at less than 0.5 µm and 0.05 ps, respectively.

2. The optical isolator according to claim 1, wherein an angle of the crystal axis with respect to an element surface normal direction of the first birefringent element is set at 47.8 degrees and an angle of the crystal axis with respect to an element surface normal direction of the second birefringent element is set at 59 degrees.

3. An optical isolator comprising:
a first birefringent element to which unpolarized light is transmitted and a second birefringent element to which light split into an ordinary ray and an extraordinary ray is transmitted;
a Faraday rotator, which is disposed between the first and second birefringent elements and has a rotation angle of 45 degrees when magnetically saturated;
a magnet for magnetically saturating the Faraday rotator;
a lens for converging the ordinary ray and the extraordinary ray outgoing from the second birefringent element; and
a total reflection member for completely reflecting point-symmetrically the ordinary ray and the extraordinary ray by way of conversion of the lens,
wherein the first birefringent element is constituted by a first birefringent plate and a second birefringent plate, crystal axis orientations of the first and second birefringent plates being different from each other by 180 degrees when viewed from the light incident side;
supposing that a horizontal direction is 0 degree, the crystal axis orientations of the first birefringent plate when viewed from the light incident side in a forward direction is set at 90 degrees;

a rotation direction of the Faraday rotator when viewed from an incident side of light which is transmitted through the Faraday rotator and propagated to the second birefringent element is set to a clockwise direction;
the second birefringent element is constituted by a third birefringent plate and a fourth birefringent plate, crystal axis orientations of the third and fourth birefringent plates being different by 90 degrees from each other when viewed from the light incident side;
supposing that a horizontal direction is 0 degree, the crystal axis orientations of the third birefringent plate when viewed from the light incident side in a forward direction is set at 135 degrees, and a crystal axis direction of the second birefringent element when viewed from the light incident side is set different by 45 degrees to the first crystal axis orientation;
after the unpolarized light transmitted in the first birefringent plate is split to an ordinary ray and an extraordinary ray and the ordinary ray and the extraordinary ray are transmitted in the Faraday rotator wherein polarization planes thereof are rotated 45 degrees, when the split light is transmitted through the third birefringent element, the light transmitted through the first birefringent plate as the ordinary ray is transmitted therethrough as an extraordinary ray while the light transmitted through the first birefringent plate as the extraordinary ray is transmitted therethrough as an ordinary ray, and the resulting ordinary ray and extraordinary ray are transmitted in the lens and completely reflected point-symmetrically by the total reflection member at a single point;

the ordinary ray and the extraordinary ray, which are completely reflected by the total reflection member, are transmitted in the fourth birefringent plate and then re-transmitted in the Faraday rotator; when the ordinary ray and the extraordinary ray are lastly transmitted through the second birefringent plate, the light transmitted through the fourth birefringent plate as the ordinary ray is transmitted therethrough as an extraordinary ray, while the light transmitted through the fourth birefringent plate as the extraordinary ray is transmitted therethrough as an ordinary ray; further the optical isolator has going-returning paths wherein the optical paths of an ordinary ray and an extraordinary ray are matched when the ordinary ray and the extraordinary ray are transmitted through the second birefringent plate;

the optical path length from a center of polarization plane of the ordinary ray launched in the lens from the third birefringent element to the single point on the total reflection member and the optical path length from a center of polarization plane of the extraordinary ray launched in the lens from the second birefringent element to the single point on the total reflection member is set equal; and the first birefringent element has a crystal axis orientation with respect to an element surface normal direction and an element surface normal direction thickness which are necessary for setting an isolated width difference and a polarization mode dispersion between the ordinary ray and the extraordinary ray produced in the second birefringent element at less than 0.5 µm and 0.05 ps, respectively.

4. The optical isolator according to claim 3, wherein an angle of the crystal axis with respect to an element surface normal direction of the second birefringent element is set at 47.8 degrees and an angle of the crystal axis with respect to an element surface normal direction of the first birefringent element is set at 59 degrees.

5. The optical isolator according to any one of claims 1 to 4, wherein the thickness of the first birefringent element in the element surface normal direction is set at a value greater than 105 μm.

6. The optical isolator according to any one of claims 1 to 4, wherein the lens is a GRIN lens and a total reflection film is integrally formed on an end face of the lens as the total reflection member.

7. An optical device comprising: the optical isolator according any one of claims 1 to 4; and a plurality of optical fibers which are optically coupled to the optical isolator.

8. The optical device according to claim 7, wherein a light inlet/outlet end of the optical fiber is formed to be inclined.

9. The optical device according to claim 7, wherein an allowable bending radius of the optical fiber is set at 15 mm or less.

10. The optical device according to claim 8, wherein an allowable bending radius of the optical fiber is set at 15 mm or less.

11. The optical device according to claim 7, wherein the optical fiber is an expanded core optical fiber.

12. The optical device according to claim 8, wherein the optical fiber is an expanded core optical fiber.

13. The optical device according to claim 9, wherein the optical fiber is an expanded core optical fiber.

* * * * *